(12) United States Patent
Eisenhour

(10) Patent No.: US 6,782,945 B1
(45) Date of Patent: Aug. 31, 2004

(54) DUAL ZONE AUTOMATIC CLIMATE CONTROL ALGORITHM UTILIZING HEAT FLUX ANALYSIS

(75) Inventor: Ronald S. Eisenhour, West Bloomfield, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 10/373,202

(22) Filed: Feb. 26, 2003

(51) Int. Cl.[7] .................................................. B06H 1/00
(52) U.S. Cl. ..................... 165/203; 236/49.3; 236/91 C; 454/258
(58) Field of Search .............................. 236/49.3, 91 C; 62/179; 454/258; 165/203

(56) References Cited

U.S. PATENT DOCUMENTS

| | | | |
|---|---|---|---|
| 5,553,661 A | * 9/1996 | Beyerlein | 165/203 |
| 5,832,990 A | 11/1998 | Eisenhour | 165/202 |
| 5,995,889 A | 11/1999 | Eisenhour | 701/36 |
| 6,272,871 B1 | 8/2001 | Eisenhour | 62/225 |
| 6,272,873 B1 | 8/2001 | Bass | 62/238.3 |
| 6,607,029 B2 | * 8/2003 | Danieau | 165/203 |

* cited by examiner

Primary Examiner—William Wayner
(74) Attorney, Agent, or Firm—Foley & Lardner LLP

(57) ABSTRACT

A method for automatically controlling the climate in a plurality of climate control zones of a cabin of an automobile comprising at least a driver zone and a passenger zone having a temperature sensor located in a driver side zone and at least one conditioned air outlet vent in each of the zones, the method comprising, obtaining various values indicative of internal and external climate, determining outlet temperatures and mass flow rates of at least one of a driver zone outlet and at least one of a passenger zone outlet based at least on the above obtained values and on other factors relating to the design of the automobile, including a zone air crossover influence factor, providing conditioned air to the cabin from at least one of the driver zone outlets and at least one of the passenger zone outlets at the determined outlet temperatures and mass flow rates.

52 Claims, 7 Drawing Sheets

DUAL ZONE AUTOMATIC CLIMATE CONTROL ALGORITHM UTILIZING HEAT FLUX ANALYSIS

CROSS-REFERENCE TO RELATED PATENT APPLICATIONS

The invention is related to the inventions disclosed in U.S. Pat. No. 5,832,990 and U.S. Pat. NO. 5,995,889, the contents of which are incorporated by reference herein in their entirety.

BACKGROUND OF THE INVENTION

An example of a climate control system of the prior art is seen in FIG. 1. The system comprises an electronic microprocessor controller 26 which receives a temperature signal from an interior air temperature sensor 28. It also receives signals from a solar heat sensor 30 and an ambient air temperature sensor 32. The controller 26 will develop a voltage, as shown at 34, for controlling the speed of the blower 36 as air is passed by the blower over an evaporator 38 and a heater core 40. In a conventional fashion, the air flow that passes over the heater core 40 can be controlled by a blend door 42, the opening of which is controlled by an air mix controller 44. The processor 26 in a conventional fashion will activate the blend door as indicated schematically at 46.

Air is distributed to the upper control panel area as shown at 48 or to the lower floor area of the vehicle as shown at 50, depending upon the position of door 52, which is under the control of an air mode controller 54. The controller 26 activates the air mode controller 54 as shown at 56.

The vehicle operator may set the desired temperature with a conventional control head, the output of which is distributed to the controller as an input.

Intake air mass flow is also determined by the electronic controller 26, as indicated by control line 60.

The electronic controller may be one of a variety of known digital microprocessors (e.g., an 8-bit, single-chip microcomputer). It includes a read-only memory (ROM) in which the heat flux control equation is stored. It has the usual random-access memory registers (RAM) that receive information from the sensors before it is looked upby the central processor unit (CPU) and used by the CPU logic to act upon the stored equation in ROM to produce an output for the driver circuits. In known fashion, the processor monitors the sensor information during successive control loops as it performs sequentially the process steps.

The interior heat content for an automotive vehicle is affected by a number of variables including but not limited to the sun load heat flux ($kW/m^2$), the effective glass area capable of transmitting a solar heat load, the heat generated by passengers and electronic devices within the vehicle passenger compartment, the ambient temperature of the air surrounding the vehicle, the mass air flow rate (enthalpy rate per degree), the average outlet temperature of the air conditioning system, and the heat transfer coefficient for heat transfer between the passenger compartment and the ambient air. An automotive temperature control system should take the thermodynamic interaction of these variables into account in an attempt to maintain a target interior temperature in the most effective way.

U.S. Pat. No. 5,832,990, which was awarded to the present inventor, is an example of an automatic climate control system for vehicles that respond to the above mentioned variables, including airflow. The '990 patent teaches an automatic interior temperature control system for an automotive vehicle capable of controlling heat flux in response to changes in (but not limited to) ambient temperature, outlet temperature, sun load and air flow by taking into account the relationship between these four variables in accordance with thermodynamic principles wherein an adjustment in heat flux corrects an interior temperature error. U.S. Pat. Nos. 6,272,871 and 6,272,873 are examples of prior art air conditioning systems, the content of which is incorporated herein by reference.

SUMMARY OF THE INVENTION

There is a desire to automatically control the temperature in two zones inside a vehicle while an adjustment in heat flux corrects an interior temperature error. Some climate control algorithms calculate two separate outlet temperatures that are based on empirically determined factors or gains applied to various sensor inputs that depend on expensive trial and error vehicle level testing. These algorithms do not take into account heat flow considerations, or at best minimize the heat flow considerations due to the absence of the direct influence of system airflow in the calculation method. This omission creates error and considerable compromise in the task of achieving an appropriate climate for each zone, particularly when the target zone temperatures differ.

This is a problem because in a typical operating environment, for example, either more or less cooling is required depending upon whether the vehicle is unshaded or shaded. The previous dual zone climate control systems attempt to adjust the outlet temperatures to achieve a target interior temperature without taking into account the effect of air flow in the control of total heat load. They are designed to affect adjustment in the temperature of the system outlet, but they do not provide a quantifiable and significant change in the total heat flux itself as the system attempts to achieve a target interior temperature.

The present inventor has discovered a dual zone automatic climate control algorithm utilizing a heat flux analysis that overcomes the deficiencies in the prior art. The present inventor has discovered a set of control equations for a dual zone (by way of example and not by limitation: left-right) using energy balance considerations for the thermal influence in the vehicle cabin. The factor of airflow is included directly in the calculations of the two outlet temperatures. This considerably simplifies the development process and often inherently corrects errors that are generated by neglecting the direct influence of airflow. A logic system utilizing the equations addresses thermal balance of two zones that may have a single interior temperature sensor (for low cost reasons) to ones with multiple interior sensors. Further, the present invention can provide for a single airflow source for the system, but is not limited to such a design. In such a scenario, a primary zone and a secondary zone is defined for the purpose of control priority. The primary zone can be used to govern the transient (overall cabin temperature correction) and set up the total system airflow. The secondary zone can be provided with a stabilization enhancement logic that may provide increases to the system airflow, only when the full cold or full hot outlet temperatures are not sufficient for that zone's temperature achievement. In addition, the secondary zone can be provided with transient enhancement logic, which creates a temporary outlet temperature overshoot that depends on the rate of this zone's temperature target adjustment.

In one embodiment of the present invention, there is a method for automatically controlling the climate in a plurality of climate control zones of a cabin of an automobile comprising at least a first zone and a second zone having a temperature sensor located in the first zone and a conditioned air outlet vent in each of the zones, the method comprising, obtaining a target temperature value for the first zone and the second zone; obtaining a first zone temperature value estimate from the sensor in the first zone; obtaining an ambient air temperature value; obtaining a sun load heat flux value for at least one of the first zone and the second zone; obtaining a first zone gain factor value based at least on the first zone temperature value estimate; automatically determining the outlet temperatures and the mass flow rates of the first zone outlet and the second zone outlet based at least on the above obtained values and on a conduction/convection heat transfer coefficient between the cabin and the ambient air, an effective glass area for solar load transmission, a zone air crossover influence factor, and predetermined constraints on the relationship of the outlet temperatures and air flow, wherein the zone air crossover influence factor is a factor based on blending of the air in the cabin; and providing conditioned air to the cabin from the first zone outlet and the second zone outlet at outlet temperatures and mass flow rates correlating to the determined outlet temperatures and mass flow rates.

In another embodiment of the present invention there is a method wherein the zone air crossover influence factor is variable and depends on an air distribution mode.

In another embodiment of the present invention the method further includes calculating an error term and subtracting it from the second zone outlet temperature to establish a new second zone outlet temperature, the error term comprising a value based on the first zone target temperature value, the first zone temperature value estimate, the mass air flow rate of the second zone outlet, and a second zone gain factor value based at least on the first zone temperature value estimate, wherein the conditioned air provided to the second zone is at the new second zone outlet temperature.

In another embodiment of the present invention, there is a method wherein the first zone gain factor value and the second zone gain factor value are approximately equal when the first zone temperature estimate is between about 20° C. and about 28° C.

In another embodiment of the present invention, there is a method wherein the first zone gain factor value and the second zone gain factor value vary inversely in relation to changing first zone temperature estimates between at least the range from about 10° C. to about 20° C. and between at least the range from about 28° C. to about 35° C.

In another embodiment of the present invention, there is a method wherein the first zone gain factor value decreases with increasing first zone temperature estimates below about 20° C. and increases with increasing first zone temperature estimates above about 28° C.

In another embodiment of the present invention, the method further includes calculating an overset value to be added to the second zone outlet temperature value, the overset value comprising a value based on the second zone target temperature value, the conduction/convection heat transfer coefficient between the cabin and the ambient air, and the mass air flow rate, as adjusted by a value that sets the strength of the overshoot.

In another embodiment of the present invention, there is a method wherein the mass flow rate of the conditioned air provided to the first zone is about the same as the mass flow rate of the conditioned air provided to the second zone.

In another embodiment of the present invention, the method that further includes calculating a minimum mass air flow rate based on the conduction/convection heat transfer coefficient between the cabin and the ambient air, the second zone target temperature value, the ambient air temperature value, the sun load heat flux value for the second zone, the effective glass area for solar load transmission, and a capacity temperature value selected from a group consisting of a constant cooling device temperature and a constant heating device temperature, and wherein the mass air flow rate of the conditioned air delivered to the cabin is based on the calculated minimum mass air flow rate.

In another embodiment of the present invention, there is a method wherein the mass air flow rate of the air delivered to the cabin is limited to a predetermined maximum mass air flow rate above a variable mass flow rate based on predetermined constraints.

In another embodiment of the present invention, the variable mass flow rate is based on predetermined constraints is substantially correlated to various blower voltages, the maximum mass air flow rate is substantially correlated to the blower voltage, and wherein the maximum mass air flow rate is limited to an equivalent blower voltage that is no greater than about 2 volts above the equivalent voltage of the mass air flow rate based on predetermined constraints.

In another embodiment of the present invention, there is a method wherein the conditioned air provided to the cabin from the first zone outlet and the second zone outlet at outlet temperatures and mass flow rates is equal to the determined outlet temperatures and mass flow rates, respectively.

In another embodiment of the present invention, there is a method for automatically controlling the climate in a plurality of climate control zones of a cabin of an automobile comprising at least a first zone and a second zone having a temperature sensor located in a first zone and an conditioned air outlet vent in each of the zones, the method comprising at least utilizing an algorithm relating to at least the equations $$ToD=[TGT(D)+(Ge \cdot (TGT(D)-RMd)+K \cdot (TGT(D)-T_a)-q_{s(D)} \cdot GL)/GA-R \cdot ToPa]/(1-R)$$

and $$ToP=ToD+\{[TGT(P)-TGT(D)] \cdot (1+K/GA)-[q_{s(P)}-q_{s}(D)] \cdot GL/GA\}/(1-R)$$

where:
ToD=First zone outlet temperature,
ToP=Second zone outlet temperature,
TGT(D)=First zone target temperature,
TGT(P)=Second zone target temperature,
Ge=Gain factor,
RMd=First zone temperature estimate from sensor,
$q_{s(D)}$=First zone sun load heat flux,
$q_{s(P)}$=Second zone sun load heat flux,
GL=Effective glass area for solar load transmission,
$T_a$=Ambient temperature,
GA=Mass air flow rate,
K=Conduction or convection heat transfer coefficient between the cabin and the ambient air,
R=Zone crossover influence factor,
ToPa=The second zone's true outlet temperature, (Evaporator Temperature ≦ToPa≦Heater Air Outlet Temperature, the method comprising, automatically determining ToD, ToP, and GA by solving the above equations with predetermined constraints on the relationship of ToD, ToP, and GA; and providing conditioned air to the cabin from the first zone outlet and the second zone outlet at outlet temperatures and mass flow rates correlating to the determined outlet temperatures and mass flow rates.

In another embodiment of the present invention, there is a method wherein $$Ge' \cdot (TGT(D)-RMd)/GA$$

is subtracted from the calculated value of ToP, wherein Ge' is a gain factor less than or equal to Ge.

In another embodiment of the present invention, there is a method wherein Ge and Ge' are approximately equal when the first zone temperature estimate is between about 20° C. and about 28° C.

In another embodiment of the present invention, there is a method wherein Ge and Ge' vary inversely in relation to changing first zone temperature estimates between at least the range from about 10° C. to about 20° C. and between at least the range from about 28° C. to about 35° C.

In another embodiment of the present invention, there is a method wherein Ge decreases with increasing first zone temperature estimates below about 20° C. and increases with increasing first zone temperature estimates above about 28° C.

In another embodiment of the present invention, there is a method wherein $$\text{OverSet} \cdot [1+K/GA]$$

is added to the value of ToP, where $$\text{OverSet}=X \cdot (TGT(P)-F\text{Set}),$$

where X is a calibration value, and where $$F\text{Set}=F\text{Set}+Y \cdot (TGT(P)-F\text{Set}),$$

where Y is a multiplier that is arbitrarily set to allow the FSet equation to be utilized in an algorithm that obtains the unity value of FSet by a loop routine.

In another embodiment of the present invention, the method further includes calculating a minimum mass air flow rate from the equation:

$$GA=K \cdot (TGT(P)-Ta-q_s(P) \cdot GL/K)/(\text{Capacity Temperature}-TGT(P))$$

where Capacity Temperature is a value selected from a group consisting of a constant cooling device temperature and a constant heating device temperature, and wherein the mass air flow rate of the conditioned air delivered to the cabin is based on the calculated minimum mass air flow rate.

In another embodiment of the present invention, there is a method wherein the mass air flow rate of the air delivered to the cabin is limited to a predetermined maximum mass air flow rate above a variable mass flow rate based on predetermined constraints.

In another embodiment of the present invention, there is a method wherein the variable mass flow rate based on predetermined constraints is substantially correlated to various blower voltages, the maximum mass air flow rate is substantially correlated to the blower voltage, and wherein the maximum mass air flow rate is limited to an equivalent blower voltage that is no greater than about 2 volts above the equivalent voltage of the mass air flow rate based on predetermined constraints.

In another embodiment of the present invention, there is a method wherein the constraints include human constraint factors that modify thermodynamic constraint factors in the relationship of air flow and the outlet temperatures, and wherein the method further includes repeatedly addressing the constraints in response to incremental changes in variables in the equations to effect a change that will result in a modification of the outlet temperatures.

In another embodiment of the present invention, there is a method wherein the conditioned air provided to the cabin from the first zone outlet and the second zone outlet at outlet temperatures and mass flow rates is equal to the determined outlet temperatures and mass flow rates, respectively.

In another embodiment of the present invention, there is an automatic climate control apparatus for automatically controlling the climate in a plurality of climate control zones of a cabin of an automobile comprising at least a first zone and a second zone, comprising, an air blower adapted to blow conditioned air into the cabin; an air outlet vent in the first zone in fluid communication with the air blower; an air outlet vent in the second zone in fluid communication with the air blower; an air cooling device and an air heating device in fluid communication with the air blower, the first zone vent, and the second zone vent; a temperature sensor located in the first zone adapted to provide a temperature value estimate of the first zone; an electronic processor device comprising a processor and a memory, wherein the memory is adapted to store a plurality of equations, the plurality of equations including equations for the air outlet temperatures and mass flow rates of the first zone outlet and the second zone outlet, the equations being based on variables including, a target temperature value for the first zone and the second zone; a first zone temperature value estimate; an ambient air temperature value; a sun load heat flux value for at least one of the first zone and the second zone; a first zone gain factor value based at least on the first zone temperature value estimate; a conduction/convection heat transfer coefficient between the cabin and the ambient air; an effective glass area for solar load transmission; and a zone air crossover influence factor, wherein the zone air crossover influence factor is a factor based on the blending of the air in the cabin; wherein the electronic processor is adapted to automatically control and adjust the mass flow rate and the temperature of the air being blown from the vents based on the equations as constrained by predetermined constraints on the relationship of the outlet temperatures and air flow.

In another embodiment of the present invention, the apparatus includes a device adapted to vary the amount of air entering the cabin that has passed through or around the air heating device.

In another embodiment of the present invention, the apparatus includes an automobile having an automatic climate control system.

In another embodiment of the present invention, the apparatus is adapted so that the conditioned air provided to the cabin from the first zone outlet and the second zone outlet at outlet temperatures and mass flow rates is equal to the determined outlet temperatures and mass flow rates, respectively.

In another embodiment of the present invention, there is a device for controlling at least one component of a climate control system that controls the climate in a plurality of climate control zones of a cabin of an automobile comprising at least a first zone and a second zone, comprising, a device adapted to receive a signal representing the mass flow rate of conditioned air being blown into the cabin; a device adapted to output a signal to control the heating and cooling of air being blown into the cabin; a device adapted to output a signal to control the mass flow rate of air being blown into the cabin; a device adapted to receive a signal representative of a sensed temperature inside the cabin; a device storing an algorithm based on at least a plurality of equations, the plurality of equations including equations for air outlet temperatures and mass flow rates of first zone outlet and second zone outlet, the equations being based on variables including, a target temperature value for the first zone and the second zone; a first zone temperature value estimate; an ambient air temperature value; a sun load heat flux value for at least one of the first zone and the second zone; a first zone gain factor value based at least on the first zone temperature value estimate; a conduction/convection heat transfer coefficient between the cabin and the ambient air; an effective glass area for solar load transmission; and a zone air crossover influence factor, wherein the zone air crossover influence factor is a factor based on the blending of the air in the cabin; and a device storing a plurality of predetermined constraints on the relationship of the first zone and second zone outlet temperatures and air flow; wherein the control device is adapted to automatically output a signal to control and adjust the mass flow rate and the temperature of the air being blown from the vents based on the equations as constrained by the predetermined constraints on the relationship of the outlet temperatures and air flows.

In another embodiment of the present invention, there is a method for automatically controlling the climate in a plurality of climate control zones of a cabin of an automobile comprising at least a first zone and a second zone having a temperature sensor located in the first zone and a temperature sensor located in the second zone and an conditioned air outlet vent in each of the zones, the method comprising, obtaining a target temperature value for the first zone and the second zone; obtaining temperature value estimates for the first zone and the second zone from the first zone temperature sensor and the second zone temperature sensor respectively; obtaining an ambient air temperature value; obtaining a sun load heat flux value for at least one of the first zone and the second zone; obtaining at least one of a gain factor value based the first zone temperature value estimate and a gain factor value based on the second zone temperature value estimate; automatically determining the outlet temperatures and the mass flow rates of the first zone outlet and the second zone outlet based at least on the above obtained values and on a conduction/convection heat transfer coefficient between the cabin and the ambient air, an effective glass area for solar load transmission, a zone air crossover influence factor, and predetermined constraints on the relationship of the outlet temperatures and air flow; wherein the zone air crossover influence factor is a factor based on the blending of the air in the cabin; and, providing conditioned air to the cabin from the first zone. outlet and the second zone outlet at outlet temperatures and mass flow rates correlating to the determined outlet temperatures and mass flow rates.

In another embodiment of the present invention, there is a method wherein the zone air crossover influence factor is variable and depends on an air distribution mode.

In another embodiment of the present invention, there is a method wherein the mass flow rate of the conditioned air provided to the first zone is about the same as the mass flow rate of the conditioned air provided to the second zone.

In another embodiment of the present invention, the method further includes calculating a minimum mass air flow rate based on the conduction/convection heat transfer coefficient between the cabin and the ambient air, the second zone target temperature value, the ambient air temperature value, the sun load heat flux value for the second zone, the effective glass area for solar load transmission, and a capacity temperature value selected from a group consisting of a constant cooling device temperature and a constant heating device temperature, wherein the mass air flow rate of the conditioned air delivered to the cabin is based on the calculated minimum mass air flow rate.

In another embodiment of the present invention, there is a method wherein the mass air flow rate of the air delivered to the cabin is limited to a predetermined maximum mass air flow rate above a variable mass flow rate based on predetermined constraints.

In another embodiment of the present invention, there is a method wherein the variable mass flow rate based on predetermined constraints is substantially correlated to various blower voltages, the maximum mass air flow rate is substantially correlated to the blower voltage, and wherein the maximum mass air flow rate is limited to an equivalent blower voltage that is no greater than about 2 volts above the equivalent voltage of the mass air flow rate based on predetermined constraints.

In another embodiment of the present invention, there is a method wherein the conditioned air provided to the cabin from the first zone outlet and the second zone outlet at outlet temperatures and mass flow rates is equal to the determined outlet temperatures and mass flow rates, respectively.

In another embodiment of the present invention, there is a method for automatically controlling the climate in a plurality of climate control zones of a cabin of an automobile comprising at least a first zone and a second zone and having a temperature sensor located in the first zone and a temperature sensor located in the second zone and an air outlet vent in each of the zones, the method comprising at least utilizing an algorithm relating to at least the equations:

$$ToD = [TGT(D) + (Ge_{(D)} \cdot (TGT(D) - RMd) + K \cdot (TGT(D) - T_a) - q_{s(D)} \cdot GL)/GA_{(D)} - R \cdot ToPa]/(1-R)$$

and $$ToP = [TGT(P) + (Ge_{(P)} \cdot (TGT(P) - RMp) + K \cdot (TGT(P) - T_a) - q_{s(P)} \cdot GL)/GA_{(P)} - R \cdot ToDa]/(1-R)$$

where:

ToD=First zone outlet temperature,

ToP=Second zone outlet temperature,

TGT(D)=First zone target temperature,

TGT(P)=Second zone target temperature, $Ge_{(D)}$=Gain factor based on a first zone temperature value estimate, $Ge_{(P)}$=Gain factor based on a second zone temperature value estimate, RMd=First zone temperature estimate from sensor, RMp=Second zone temperature estimate from sensor, $q_{s(D)}$=First zone sun load heat flux, $q_{s(P)}$=Second zone sun load heat flux, GL=Effective glass area for solar load transmission, $T_a$=Ambient temperature, $GA_{(D)}$=Mass air flow rate of the first zone, $GA_{(P)}$=Mass air flow rate of the second zone, K=Conduction or convection heat transfer coefficient between the cabin and the ambient air, R=Zone crossover influence factor, ToPa=The second zone's true outlet temperature, (Evaporator Temperature ≦ToPa≦Heater Air Outlet Temperature, ToDa=The first zone's true outlet temperature,
(Evaporator Temperature $\leq$ ToDa $\leq$ Heater Air Outlet Temperature, the method comprising:

automatically determining ToD and ToP, and GA by solving the above equations with predetermined constraints on the relationship of ToD, ToP, $GA_{(D)}$ and $GA_{(P)}$; and providing conditioned air to the cabin from the first zone outlet and the second zone outlet at outlet temperatures and mass flow rates correlating to the determined outlet temperatures and mass flow rates.

In another embodiment of the present invention, there is a method wherein the conditioned air provided to the cabin from the first zone outlet and the second zone outlet at outlet temperatures and mass flow rates is equal to the determined outlet temperatures and mass flow rates, respectively.

In another embodiment of the present invention, there is a method wherein $GA_{(D)}$ is equal to or about equal to $GA_{(P)}$.

In another embodiment of the present invention, there is a method wherein $Ge_{(D)}$ is equal to or about equal to $Ge_{(P)}$.

In another embodiment of the present invention, the method further includes calculating a minimum mass air flow rate from the equation:

$$GA_{(D/P)} = K \cdot (TGT(P) - Ta - q_s(P) \cdot GL/K) / (\text{Capacity Temperature} - TGT(P))$$

where Capacity Temperature is a value selected from a group consisting of a constant cooling device temperature and a constant heating device temperature, and wherein the mass air flow rate of the conditioned air delivered to the cabin is based on the calculated minimum mass air flow rate.

In another embodiment of the present invention, there is a method wherein the mass air flow rate of the air delivered to the cabin is limited to a predetermined maximum mass air flow rate above a variable mass flow rate based on predetermined constraints.

In another embodiment of the present invention, there is a method wherein the variable mass flow rate based on predetermined constraints is substantially correlated to various blower voltages, the maximum mass air flow rate is substantially correlated to the blower voltage, and wherein the maximum mass air flow rate is limited to an equivalent blower voltage that is no greater than about 2 volts above the equivalent voltage of the mass air flow rate based on predetermined constraints.

In another embodiment of the present invention, there is an automatic climate control apparatus for automatically controlling the climate in a plurality of climate control zones of a cabin of an automobile comprising at least a first zone and a second zone, comprising: an air blower adapted to blow conditioned air into the cabin; an air outlet vent in the first zone in fluid communication with the air blower; an air outlet vent in the second zone in fluid communication with the air blower; an air cooling device and an air heating device in fluid communication with the air blower, the first zone vent, and the second zone vent; a temperature sensor located in the first zone adapted to provide a temperature value estimate of the first zone; an electronic processor device comprising a processor and a memory, wherein the memory is adapted to store a plurality of equations, the plurality of equations including equations for the air outlet temperatures and mass flow rates of the first zone outlet and the second zone outlet, the equations being based on variables including: a target temperature value for the first zone and the second zone; a first zone temperature value estimate; an ambient air temperature value; a sun load heat flux value for at least one of the first zone and the second zone; a first zone gain factor value based at least on the first zone temperature value estimate; a conduction/convection heat transfer coefficient between the cabin and the ambient air; an effective glass area for solar load transmission; and a zone air crossover influence factor, wherein the zone air crossover influence factor is a factor based on the blending of the air in the cabin; wherein the electronic processor is adapted to automatically control and adjust the mass flow rate and the temperature of the air being blown from the vents based on the equations as constrained by predetermined constraints on the relationship of the outlet temperatures and air flow.

In another embodiment of the present invention, there is a method wherein the first zone is a driver zone and the second zone is the passenger zone.

In another embodiment of the present invention, there is an apparatus wherein the first zone is a driver zone and the second zone is the passenger zone.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

DETAILED DESCRIPTION OF THE PREFERRED EMBODIMENTS

Figure 1:
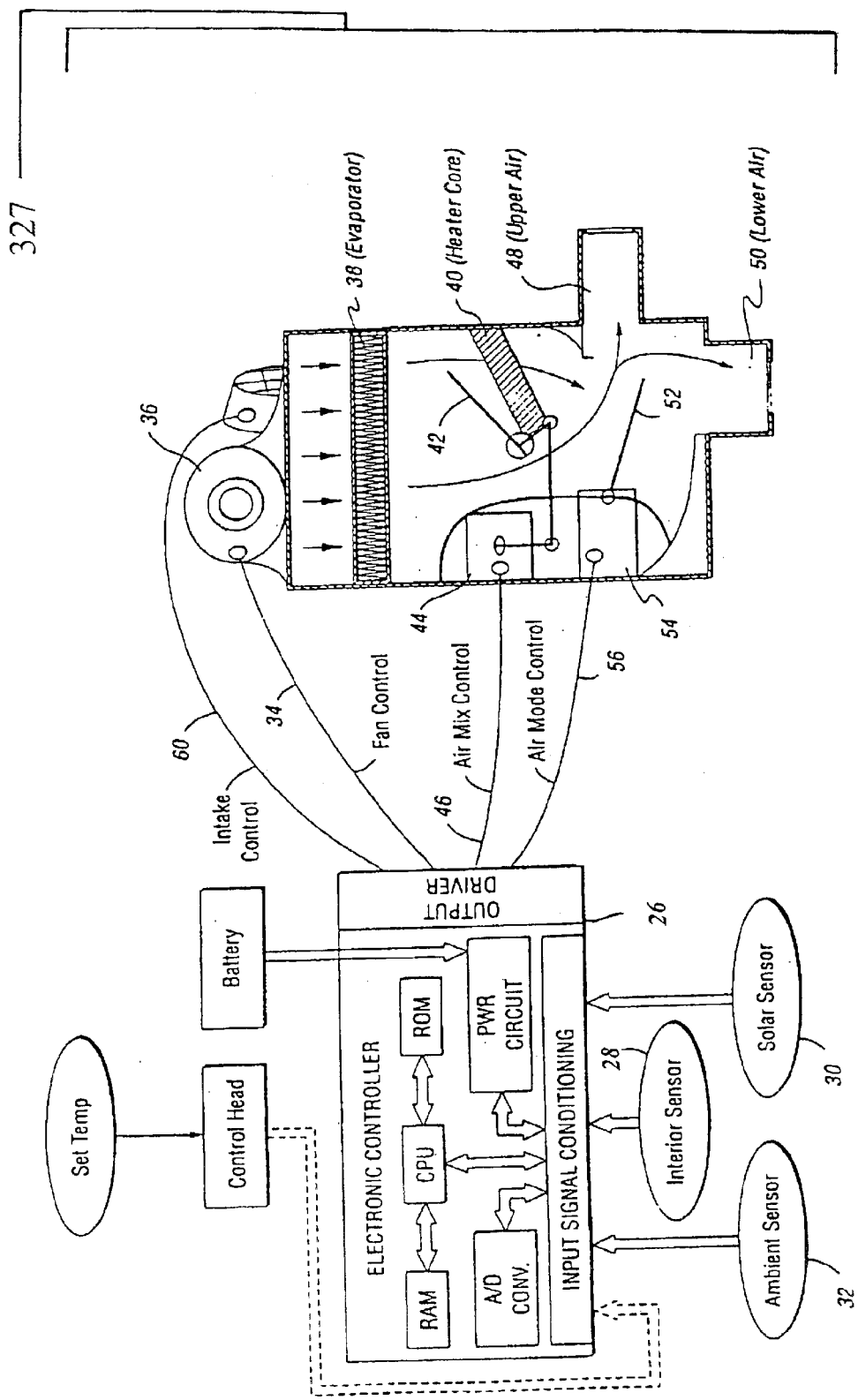
FIG. 1 schematically illustrates an overall vehicle installation of a climate control system of the prior art which can be adapted for practice with the present invention.

The climate control system of the present invention for the cabin of an automobile (such as but not limited to a car, an SUV, a minivan, a station wagon, a pickup truck, etc.) allows an occupant or a plurality of occupants to select the desired temperature to be maintained inside the cabin. For example, the present invention can permit the driver to identify a cabin temperature value (e.g. 72° F.) that the driver finds comfortable, and the climate control system of the automobile adjusts various components of the system to maintain or at least strive to achieve the set temperature (target temperature), in at least the driver' side of the cabin, while maintaining or striving to maintain a separate temperature or the same temperature in another part of the cabin. Climate control systems include but are not limited to systems that utilize air conditioning systems and heater systems. However, it is noted that the present invention can be used for any system that has an effect on cabin temperature. The present invention can be utilized with a climate control system of the prior art as seen in FIG. 1 and described above, with modifications to the system for a dual zone climate control system. For exampleFor example, there could be a separate blend door (or mix door) for the driver zone and a separate door for the passenger zone to vary the outlet temperature of the air being blown into the respective zones of the cabin. Further by way of example and not by way of limitation, there could be a separate heat transfer device 327 for the driver zone and the passenger zone, which could include by way of example, a separate evaporator and heater core. Further by way of example and not by limitation, other configurations could include separate heater cores, evaporator cores, blowers and combinations of single and dual components. Further, heat exchangers that limit internal fluid flow, as opposed to diverting airflow, may be applied.

The desired temperature, set by the driver for example, is the target temperature or stabilized or cabin average temperature of the cabin of the automobile. The temperature of the cabin is determined by a single sensor or a plurality of sensors that are located in the cabin of the automobile. During design of the automobile, the placement of the sensor/sensors tends to vary depending on the model of the automobile. For example, in the case of a single sensor, designers sometimes place the sensor on the dash board or on the ceiling of the automobile or on a center console of the automobile. Typically, the sensor location is determined based on manufacturing constraints or aesthetic design constraints of the interior of the automobile. For example, a sensor that is located on the dash board exactly in the center of the automobile may be aesthetically unpleasing to a prospective buyer of the automobile. Thus, it is often the case that the temperature sensor is located in places where less than accurate reading will be produced, or the sensor is placed in a location where the temperature sensed by the sensor lags the actual temperature or the temperature perceived by the vehicle occupants. For example, if the sensor is placed underneath the seat and conditioned air is being blown into the cabin through vents in the top of the dashboard, and the target temperature was changed, the occupants of the car would sense a change in the temperature significantly prior in time to the sensor underneath the seat sensing the change. To remedy this, empirical testing is performed in the cabin of a given automobile class, such as by way of example and not by way of limitation, a Nissan Xterra, to determine the error that is present in a system after a change in target temperature. Through extensive empirical testing that optionally takes into account human factor constraints, an error gain function can be determined to compensate for the discrepancy between the sensed temperature and the target temperature. Thus, through empirical testing, a gain function can be obtained for a given automobile class to provide a highly satisfactorily automobile climate control system for a user. It is noted that the empirical testing would probably be necessarily performed for each different class of car. Thus, for example, empirical testing results for the Nissan Xterra may not be applicable for a Nissan Maxima; thus, empirical testing will probably be necessary for the Maxima. However, it is possible that the present invention can be practiced, by using the same or similar results from one class of car for another class of car thus eliminating or reducing the empirical testing necessity.

The control systems of the present invention can include but is not limited to a series of vents that channel or expel conditioned air into an automobile cabin. (It is noted that conditioned air includes but is not limited to both cool air which would be obtained, by way of example only and not by way of limitation, from an air conditioning system, and heated air which, for example, would be obtained by passing air through or over a heater core, and would also include air at the ambient temperature as well.) These vents can have vent outlets that are located in a variety of locations in the cabin. For example, automobiles often have vent outlets on the top of the dashboard, in the dashboard roughly at the level of the user's chest, and below the dashboard roughly at the level of the user's knees or on the floor. The vent outlets are also sometimes located in door panels, in ceilings and in the rear of the cabin as well. The present invention can be practiced with vent outlets anywhere in the cabin.

The primary method of altering or maintaining the climate in the cabin of an automobile in the preferred embodiment of the present invention is by varying or maintaining an outlet temperature of the conditioned air blown into the cabin, where outlet temperature can be defined as, by way of example only but not by way of limitation, the temperature of the air as measured at the vent outlet(s). A second method of varying or controlling the climate in the cabin of an automobile is by varying the velocity, or more appropriately, the mass flow, of the conditioned air being blown into the cabin. This can be accomplished, for example, by adjusting the voltage of the electrical current being supplied to an electric motor connected to a fan. Thus, for example, by increasing the blower voltage, the velocity or mass flow of the air being blown from the vent would increase. Further by way of example, by decreasing the voltage, the velocity or mass flow rate of the air being blown into the cabin would be reduced.

For economic reasons, the automobile climate control system of the preferred embodiment of the present invention primarily operates with a blower that moves air in about the same quantity throughout the cabin. That is, by way of example, the quantity of the air being blown out the outlet on the driver's side of the automobile is the same or approximately the same amount of air being blown out the outlet on the passenger's side of the automobile. It is noted that the present inventor recognizes that minor differences in mass flow rate between the zones are almost always present in a climate control system. By way of example and not by way of limitation, in the case of a plurality of blowers, one blower may operate to move a higher quantity of air, due to, say, manufacturing tolerances, than another, even though they are set at the same speed (to deliver the same quantity of air). Further by way of example and not by limitation, the air flow passages to the zones can be configured differently, and there can be obstructions or a greater degree of obstruction in the air flow to the zones (this could be the case in the situation where the driver zone mix door is positioned to direct more air around the heater core than the passenger zone mix door). However, it is noted that in certain cases, as will be seen below, this blower speed is different from one side of the car to the other. Further, it is noted that the present invention can be practiced in a system where the mass flow rate of the air being blown out the outlets on the driver's side is different from that of the passenger's side. Such a situation would be present in the case of a system utilizing independently controlled blowers, so that the blower(s) of the driver zone would intentionally operate at a speed different than those of the passenger zone.

The present invention provides a climate control system for an automobile that operates by varying the outlet temperature of the air being blown into the cabin. The value of this outlet temperature is based on a variety of functions. That is, the outlet temperature of a preferred embodiment of the present invention is not simply the target temperature. Instead, the outlet temperature of the present invention is a temperature that will produce a sensed interior temperature, and is a function of, by way of example and not by way of limitation, the ambient temperature, the sun load, and air flow. Thus, the outlet temperature is often a dynamic temperature that varies in response to varying conditions in response to varying functions to achieve or maintain a desired target temperature. In addition, the outlet temperature is dynamic to meet the driver's and passenger's expectations. That is, their expectations as to what the climate inside the automobile should feel like is taken into account. Thus, the outlet temperature is further influenced by predetermined human factor constraints.

It is noted that the outlet temperature can be both an instantaneous temperature as well as an average temperature, depending on the types of sensors utilized to determine the temperature. It is further noted that it is not necessary to measure the outlet temperature in real time, as empirical testing can be performed to obtain accurate estimates of the outlet temperature for a given setting. By way of example and not by way of limitation, an outlet temperature can be estimated based on empirical testing at a given blend door position based on the evaporator temperature and the heater core temperature, the combination of the two creating the outlet temperature. This information can be stored in an onboard computer, and thus looked up. Thus, the outlet temperatures can be substituted with variables representing the position or setting of one or more of the components used to vary the outlet temperature in the automobile.

The control equation taught in the '990 patent provides a teaching of an algorithm to calculate the average outlet temperature of the air leaving the outlet of the air vents of a climate control system. The control equation is a suitable foundation for the present invention because it inherently manages interior temperature without the necessity for making complex and tedious gain adjustments, and is derived from the stabilized interior temperature of an automobile. The equation for the outlet temperature in a system embodying the teachings of the '990 patent reacts to changes in air flow to keep the interior temperature at a target value. By altering air flow, changes are made automatically in the way that the heat control equation behaves. Thus, on a hot, sunny day, if the air flow should be decreased, the outlet temperature will become colder in order to keep the target interior temperature at the desired level.

The '990 patent also teaches human factor constraints that can be used in an automatic climate control system for an automobile. These teachings are applicable to the present invention and are incorporated herein in their entirety. A preferred embodiment of the present invention utilizes some or all of the human factor constraints taught in the '990 patent.

In conjunction with the teachings of the '990 patent, it is seen that in a climate control system for a vehicle, where the cabin heat flux (e.g. energy vs. time, with or without a direction component) relationship is constant, the stabilized energy balance relationship for the vehicle cabin can be expressed as follows:

$$0 = GA \cdot (TGT - T_o) + K \cdot (TGT - T_a) - q_s \cdot GL \quad (1)$$

with, $T_o$ = the average outlet temperature,
TGT = the stabilized room or cabin average temperature,
$q_s$ = the sun load heat flux,
GL = the effective glass area for solar load transmission,
$T_a$ = the ambient temperature (exterior), GA = the mass air flow rate (enthalpy rate/degree),
K = the conduction or convection heat transfer coefficient (including area) between the room and ambient.

By solving equation (1) for $T_o$, a basic climate control equation for the stabilized condition that allows for the calculation of the outlet temperature required to provide a given target cabin temperature is as follows:

$$T_o = \text{target} + (1/GA) \cdot [K \cdot (\text{target} - T_a) - q_s \cdot GL] \quad (2)$$

Figure 2:
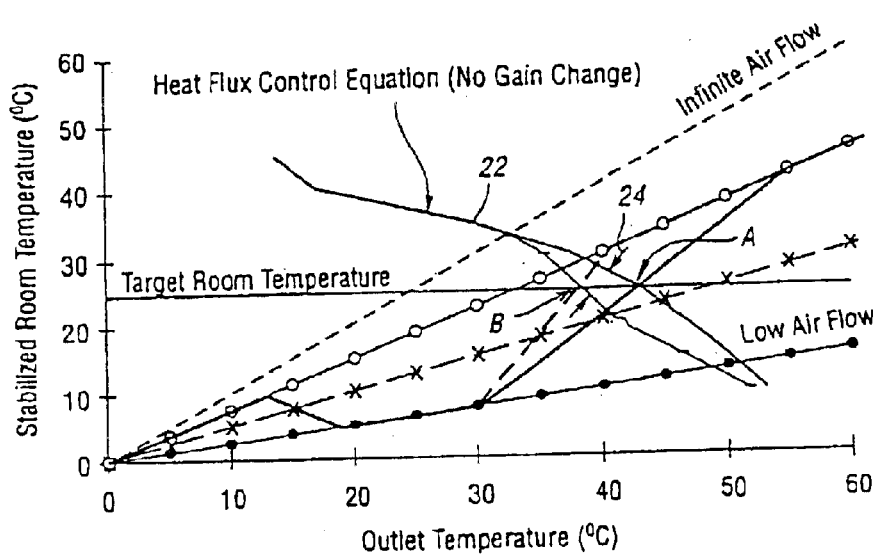
FIG. 2 schematically illustrates the stabilized condition that is obtained when air flow changes as the target cabin temperature is maintained during calibration of the system.

The above equation, plotted at 22 in FIG. 2, uses heat transfer constants K and GL as the primary calibration values.

The interaction between air flow tuning and the interior temperature is taken into account in a preferred embodiment in this proportional control of the heat flux. It does this by combining all of the variables automatically. Once adjustments are made to the heat flow term, the heat flux relationship of the invention accounts automatically for variations in all of the other factors. Thus, the control equation used in practicing the invention inherently manages interior temperature without the necessity for making complex and tedious gain adjustments when airflow is not present in the control equation.

The equation for the outlet temperature in a system embodying the present invention will react to changes in air flow to keep the interior temperature at a target value. By altering air flow, changes are made automatically in the way that the heat control equation behaves. Thus, on a hot, sunny day, for example, if the air flow should be decreased, the outlet temperature will become colder in order to keep the target interior temperature at the desired level.

If the air flow is changed during calibration to produce the divergence indicated at 24 in the plot of FIG. 2, the stabilized room temperature condition will be maintained. This is indicated by the intersection of line 22 with the target room temperature line at point "A" and the corresponding intersection point after an air flow calibration change, as shown at point "B".

In FIG. 2, the heat flux control equation plotted with the heavy line 22 will intersect the 25 degree room temperature line at an outlet temperature of about 42 degrees. The corresponding outlet temperature following air flow adjustment is about 37 degrees, as shown in FIG. 2.

It is noted that FIG. 2 shows a situation where no error exists between the interior temperature and the target temperature. That is, if the interior temperature equals the target temperature, the outlet temperature is calculated directly from equation (2). The impact of an error on equation (2) is discussed below.

For a condition with a different sun load and target temperature, the change in the outlet temperature is calculated by:

$$\Delta T_o = \Delta TGT + [K \cdot \Delta TGT - GL \cdot \Delta q_s] \cdot (1/GA)$$

$$\Delta T_o = (\Delta TGT) \cdot (1 + K/GA) - \Delta q_s \cdot (GL/GA) \quad (3)$$

It is noted that equations (1)–(3) are applicable to single zone climate control systems. In a single zone climate control, the cabin is regarded as one mass of uniform temperature air. Conditioned air at the same average outlet temperature is delivered to both sides of the vehicle and there is little or no net heat transfer between the zones. That is, the air is at approximately the same temperature. Thus, the equation (2) is applicable to the entire cabin or it can be applied to each zone in individual equations bearing half the total system airflow (GA), half the glass area (GL) and half the surface for conduction (K). It is noted that halving will arithmetically cancel and the outlet temperature of equation 2 is not affected by this conceptualization.

In a traditional vehicle climate control system, the conditioned air delivered to the cabin is the same air delivered on both sides of the cabin. That is, by way of example, a vent in the driver's zone of the cabin nearest to the door would output air having an outlet temperature the same as or about the same as a vent on the passenger's zone of the cabin that is nearest to the passenger's door. Further by way of example, this would be the case with a vent positioned near the center of the cabin but still in the driver's zone and a vent positioned near to the center but in the passenger's zone. This would also be the case in situations where, say, there are more vents on one side of the cabin than the other side of the cabin, or in the case where the vents are not evenly spaced (by way of example to accommodate a steering wheel or a glove box) and/or situations where the vents are not evenly spaced and more vents are located on one side of the compartment than the other side of the compartment. In the dual zone climate control system according to the present invention, it is possible to deliver conditioned air at different outlet temperatures into each zone.

Figure 3:
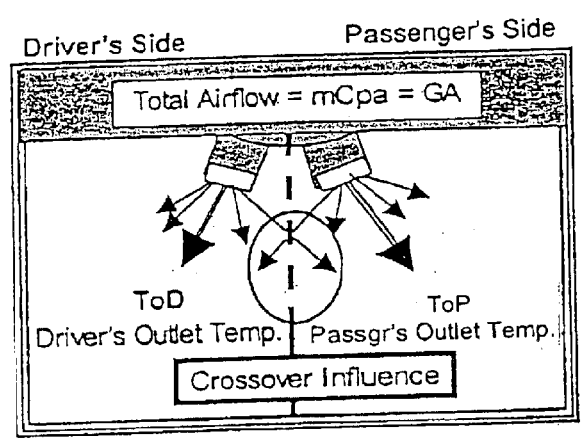
FIG. 3 schematically illustrates a dual zone cabin.

Vehicle geometry can play a role in the extent of mixing that will occur between the two zones, resulting in a crossover influence. In a dual zone automobile climate control system the outlet temperature of the conditioned air being blown from a vent in the driver's zone could be different than the outlet temperature of the conditioned air being blown from a vent in the passenger's zone. Thus, in such a situation, the air on one side of the cabin would be at a temperature that is different than the temperature of the air on the other side of the cabin, thus providing the capability of accommodating both the driver's and the passenger's desires with respect to cabin climate. Air masses of different temperatures have an effect on one another in regard to temperature. That is, the air masses exert a cross over influence on one or the other because the air is generally free to move from one side of the cabin to the other. Indeed, in such situations, air can be blown from one side of the cabin to the other. For example, if a vent nearer to the center of the cabin but still in the driver's zone is directed towards the passenger's zone of the automobile, air at the outlet temperature of the driver's zone would be blown into the passenger's side of the compartment. Still, even in the case where, for example, air from the driver's zone outlets is being blown away from the passenger's zone of the cabin and in the case where air from the passenger's zone outlet is being blown away from the driver's zone of the cabin, air will still cross from one side of the cabin to the other. For example, this is seen in the case of an automobile that has a center console which often plays a prominent role in separating the air masses in the case of air that is being blown out of floor vents. The larger in general, or the higher (e.g. measured from the floor) specifically the center console, less of a cross over influence will be present. Further by way of example and not by limitation, seat geometry plays a role, as well as ceiling geometry. Ceiling geometry, in the case of, say, a center console attached to the roof which could include lighting, a compass, temperature gauges, a video monitor, etc., plays a role as well. In sum, air will move from one side of the cabin to the other, and the amount of air is dependent on the vehicle geometry which is generally fixed. FIG. 3 conceptually shows the mixing that occurs between zones. The present invention provides an algorithm to account for this phenomenon.

As noted above, the present invention utilizes the same blower speed for both the driver and passenger zones of the automobile. Thus, in determining the crossover influence of air from one zone of the cabin to the other zone of the cabin, an assumption can be made that the air flow into the two zones are equal. As can be seen from the above discussion concerning cabin interior geometry, this crossover effect will be variable depending on the model of the automobile and indeed even perhaps some of the selected additional features of the same model as well. Still, the crossover influence can be determined through empirical testing of a given automobile design. Thus, it is expedient to identify a factor that can be inputted into equation (2) to account for the crossover influence. It is noted that usually the crossover influence, while almost always present, is often minimal. Nonetheless, it is something that can be taken into account, as will be seen below.

As with traditional climate control systems, a preferred embodiment allows the driver to input a desired blower speed. For example, the driver could be provided with, say, a four position switch which, depending on what position is selected, would provide a different blower speed, thus providing a different mass flow rate into the cabin. In such a situation, the human factor constraints used to constrain the control equations could be overridden based on this inputted blower speed in the case where the blower speed is different than the blower speed identified by the results of the human factor tests. In such a situation, the control system would then identify a new outlet temperature based on this new mass flow rate. This outlet temperature would be calculated directly from the control equations. Thus, in such a situation, the general value of GA would be controlled by the user. It is noted that while the user can have control over the blower speed by adjusting the setting on the switch, the user may not have total control over the speed. That is, he or she will have control over an approximate or general blower speed, and the controller would make minor adjustments to the blower speed, adjustments predetermined through empirical human factor tests.

It is noted that while the terminology here utilizes the phrases "driver zone" and "passenger zone," the phrases "first zone" and "second zone" could be used respectively or visa-versa. That is, the driver zone and the passenger zone simply represent zones in the automobile, and are used here for convenience and clarity.

As noted above, the mass flow rate of air being blown into the cabin is the function of not only the blower speed, but also the obstructions to the air being conditioned and blown into the cabin. For example, in a scenario when the mix door is located at the full closed position, there is less of an obstruction to the airflow than when the door is placed on the full cold condition. Thus, there is less of a pressure drop in the air flow channels in the full cold position, and air will flow at a higher mass flow rate into the cabin at the full cold position than the full hot position even though the blower speed is the same in both instances. It is noted that empirical testing can be performed on a given model automobile to determine how the position of, for example, the mix door changes the mass flow rate. Therefore, a preferred embodiment of the present invention could also include a controller that stores empirically determined mass flow rates based on both varying blower speed as inputted by the driver as well as varying obstructions in the airflow. These values could then be utilized in the control equations for the mass flow rate.

For the sake of simplicity, it is assumed that the airflow into the two zones are equal. Thus, the true average outlet temperature into either zone will depend on an empirically determined factor that is a blend of the outlet temperatures of the vents in the driver's zone of the cabin (ToD) and the passenger's zone of the cabin (ToP). The factor "R" is designed for this effect and between 0 and 0.5, and generally but not always and certainly not by limitation between 0.05 and 0.2, and often about 0.1. Application of this factor in equation form in relation to the two zones as seen in FIG. 3 results in:

$$\text{Driver's True Average Outlet Temp} = (1-R) \cdot ToD + R \cdot ToP \quad (4)$$

and $$\text{Passenger's True Average Outlet Temp} = (1-R) \cdot ToP + R \cdot ToD \quad (5).$$

The aim of the driver's side control equation (4) is to calculate ToD, which may be altered to account for the passenger's temperature influence. This is done by the following algebraic steps that begin using equation (2) with the driver's target temperature and sun load specified TGT(D) and $q_{s(D)}$ respectively:

$$(1-R) \cdot ToD + R \cdot ToP = TGT(D) + (1/GA) \cdot [K \cdot (TGT(D) - T_a) - q_{s(D)} \cdot GL]$$

Thus, $$ToD = [TGT(D) + (K/GA) \cdot (TGT(D) - T_a) - q_{s(D)} \cdot (GL/GA) - R \cdot (ToP)]/(1-R).$$

As noted above, there is often an error associated with the temperature sensed by a temperature sensor in the automobile. That is, there is a difference between the target room temperature and the actual cabin temperature, where the actual cabin temperature is a temperature measured by the sensor. Through empirical testing associated with a given vehicle design, an error term can be identified that will provide a consistent heat flux gain for proportional corrections. This error term can be added to equation (4) along with a function based on the difference between the drivers' zone room temperature estimate and the drivers' target temperature. The error correction term uses the driver's zone room temperature estimate (RMd) and an error gain (Ge). The equation becomes:

$$ToD = [TGT(D) + (Ge \cdot (TGT(D) - RMd) + K \cdot (TGT(D) - T_a) - q_{s(D)} \cdot GL)/GA - R \cdot ToP]/(1-R)$$

However, through testing, it has been determined that a value of ToP in the above equation should be constrained to a value equal to or greater than the evaporator temperature but less than or equal to the heater air outlet temperature. Thus, ToP is substituted by a new variable, ToPa, and the above equation becomes:

$$ToD = [TGT(D) + (Ge \cdot (TGT(D) - RMd) + K \cdot (TGT(D) - T_a) - q_{s(D)} \cdot GL)/GA - R \cdot ToPa]/(1-R) \quad (6),$$

where
ToPa=The passenger zone's true outlet temperature,
(Evaporator Temperature ≦ToPa≦Heater Air Outlet Temperature.

It is noted that in the event that ToP falls within the specified range (equal to or greater than the evaporator temperature but less than or equal to the heater air outlet temperature, ToPa=ToP.

A similar equation exists for the passenger's zone, providing that a room temperature estimate is available for that zone (RMp), which could be obtained, by way of example, from a temperature sensor placed in the passenger zone. With subscript changes for the passenger, this equation is:

$$ToP = [TGT(P) + (Ge \cdot (TGT(P) - RMp) + K \cdot (TGT(P) - T_a) - q_{s(P)} \cdot GL)/GA - R \cdot ToDa]/(1-R) \quad (7),$$

where
ToDa=The driver zone's true outlet temperature
(Evaporator Temperature ≦ToDa≦Heater Air Outlet Temperature).

In an embodiment of the present invention having a plurality of cabin temperature sensors, equations (6) and (7) can be solved by iteration in a computer controller on board the automobile. The value of R will depend on the air distribution mode (for example, whether air is blowing from the floor vents, the dashboard vents, or a combination of the two), and is determined through empirical testing. In a preferred embodiment of the present invention, the climate control system can be adapted to sense the air distribution mode and to select the appropriate value of R. The value of Ge will depend on the value of the room temperature estimates in order to provide flexibility to the transient response calibration.

In a preferred embodiment of the present invention, the computer controller periodically updates values for the above and below equations with data that is obtained via real time measurements or stored measurements, or both, and determines new temperatures and mass flow rates. This is also done when the driver or passenger changes his or her target temperature.

It is noted that a potential exists for values of one or more of the variables of equations (6) and (7), as well as the other equations presented herein, to be absent or not available. In such a situation, a preferred embodiment of the invention can utilize another variable or the last recorded value of the missing variable. That is, if a variable must be obtained to utilize the equations, the variable can be obtained by using a substitute. By way of example and not by limitation, in a preferred embodiment of the present invention, the automatic control system utilizes the driver's zone target temperature for both the driver's zone and the passenger zone until the passenger inputs a desired temperature. Again by way of example and not by limitation, if the driver inputs a target temperature of 72° F. and the passenger does not input a target temperature, the control system will use 72° F. for both the driver's side and the passenger zone equations. Further by way of example, if the passenger later inputs a temperature of, say, 75° F. while the driver does not change his or her temperature setting, the control system will utilize 75° F. as the target temperature for the passenger and 72° F. as the target temperature for the driver. As noted above, the present invention can be practiced by utilizing such logic not only for the target temperatures, but also for other variables when a value is only available for one side of the automobile. It is further noted that the values of Ge in equations (6) and (7) can be equal to each other, as seen in the equations, or equation (6) can have a value of Ge for the driver zone temperature sensor and equation (7) can have a value of Ge for the passenger zone temperature sensor.

It is further noted that the present invention can be practiced by purposely canceling out some of the terms or diminishing their impact on the equations. For example, the present invention could be practiced by utilizing a value of Ge equal to 1. Thus, equations (6) and (7) could be practiced by ignoring the gain function.

Additionally, the present invention can be practiced by utilizing the equations to determine an outlet temperature, and then adding or subtracting a value or a series of values or variable values from the determined outlet temperature, the resulting temperature being used to set the actual outlet temperature of the air being blown into the cabin. Thus, the outlet temperatures and mass flow rates of conditioned air provided to the cabin from at least one of the driver zone outlets and at least one of the passenger zone outlets need only be correlated to the determined outlet temperatures and mass flow rates, respectively. However, in a preferred embodiment, a value equal to or about equal to the outlet temperature determined from the equations is used to set the actual outlet temperature.

Figure 4:
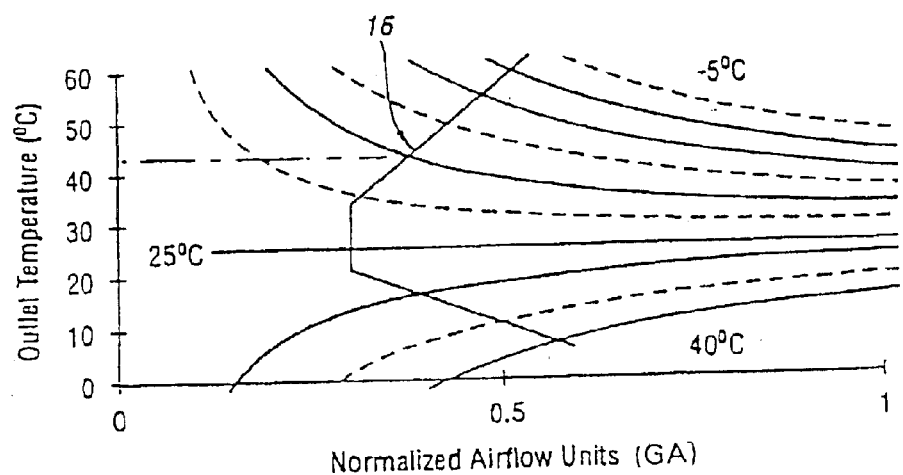
FIG. 4 schematically shows generalized energy balance constraints for a climate control system and an empirical relationship that indicates constraints imposed by human factors.

The human factor constraints of a preferred embodiment of the present invention will now be briefly discussed in an exemplary manner. As can be seen from the control equations, outlet temperature ToD and ToP is a function of a number of variables, including the ambient temperature as well as the mass flow rate. In one embodiment of the present invention, empirical testing is performed to determine the most subjectively comfortable mass flow rate and outlet temperature combinations to achieve a given specified target temperature. For example, if a target temperature is inputted as 70° F. and the ambient temperature is 50° F., there will be a variety of outlet temperatures and mass flow rates that will meet the target temperature of the cabin. However, there will be a more limited number of outlet temperatures and mass flow rates that will be found to be comfortable to the driver and/or the passenger and usually only one temperature and one mass flow rate that is most comfortable to the driver or the passenger. Thus, through empirical testing, this one most comfortable temperature and mass flow rate can be determined. For example, referring to FIG. 4, which shows an example of the relationship of air flow and outlet temperature that is derived from personal preferences and human factors, in the case where the desired target temperature is 25° C. and the ambient temperature is 15° C., empirical testing has shown for some models of automobiles that an outlet temperature of approximately 43° C. with an airflow rate, for example, of 40% of the system's maximum capacity would be most comfortable. (Note that this is just an example and empirical results may and probably will vary.) Thus, it is seen that control equations for ToD and ToP can be used with constraints based on empirical human factor results. In the preferred embodiment of the present invention, these human factor constraints are stored in a controller on board the automobile and periodically looked up to constrain the control equations. Thus, there is a predetermined relationship between the outlet temperatures and the airflow.

A preferred embodiment of the present invention utilizes a single sensor in the cabin which is located in the driver's zone. This is done based on the presumption of the desirability of the driver's zone temperature setting being dominant. That is, the system reacts to the driver's zone temperature setting more than the passenger's temperature setting. It is noted that the present invention could be practiced utilizing passenger's side dominance or some other form of dominance. However, since the preferred embodiment relies on driver zone dominance, formulation of the algorithm begins with a control equation for the driver's zone.

In this embodiment, the passenger does not have a room temperature sensor available in the passenger zone. Because a preferred embodiment of the present invention relies on driver's side dominance, equation (6) can be used to formulate an algorithm to practice the present invention. However, a new equation should be identified as a control equation for the outlet temperature for the passenger that utilizes the driver's zone sensor. This equation is obtained by utilizing equation (3) as the basis for the passenger's outlet temperature estimate in conjunction with parameters from the driver's zone, as seen in the following equation:

$$ToP-ToD=[TGT(P)-TGT(D)]\cdot(1+K/GA)-[q_s(P)-q_s(D)]\cdot GL/GA \quad (8).$$

Substituting equation (5), the equation for the passenger's true average outlet temperature, for ToP in equation (8) yields:

$$(1-R)\cdot ToP+R\cdot ToD-ToD=[TGT(A)-TGT(D)]\cdot(1+K/GA)-[q_s(P)-q_s(D)]\cdot GL/GA$$

or, solving for ToP:

$$ToP=ToD+\{[TGT(P)-TGT(D)]\cdot(1+K/GA)-[q_s(P)-q_s(D)]\cdot GL/GA\}/(1-R) \quad (9).$$

Thus, equation (9) above is a control equation of the outlet temperature for the passenger in this embodiment of the present invention of a driver's side dominant dual zone climate control system.

In the preferred embodiment of an implementation of the present invention, equations (6) and (9) are solved by iteration in a computer controller on board the automobile. However, since equation (9) does not contain an error correction term, as does equation (6), the error correction (transient response) in this embodiment of the present invention is dominated by the driver's side control equation. While this is sometimes a neutral fact, and sometimes even desirable, this fact can in some instances be disruptive to the passenger's comfort when the driver is making changes to the target temperature (TGT(D)) when the cabin temperature is stable or nearly stable. In such situations, it is convenient to subtract the error term from the value of ToP as well. These situations have been determined through empirical testing, and typically occur, but are not limited to, a perceived "comfort zone" that spans from about 20° C. to about 28° C. It is noted that this zone is determined through testing, and thus may be expanded or contracted or moved depending on the results of the testing. Thus, other embodiments of the present invention could have ranges that are wider or narrower in whole or in part than the just mentioned range. Indeed, depending on the results of the testing, the present invention could be practiced by subtracting the error term from the value of ToP in a comfort zone extending from below about 0° C. to about 50° C. and any range of temperatures in between in 0.1° C. increments. Therefore, an equation for the passenger side outlet temperature that takes into account the error term can be formulated as:

$$ToP \text{ (Comfortable Zone)}=ToP-Ge\cdot(TGT(D)-RMd)/GA \quad (10).$$

where ToP is obtained from equation (9), and only equation (9) is used to calculate the passenger outlet temperature for cabin temperatures outside the defined comfortable zone.

However, in another embodiment of the present invention, a separate error gain can be identified, preferably through empirical testing, for the passenger's zone that is separate from the error gain of the driver's zone. Thus, equation (10) becomes $$ToP(\text{Gain})=ToP=Ge'\cdot(TGT(D)-RMd)/GA \quad (11).$$

where Ge' is defined as the passenger's removal gain, determined preferably through empirical testing.

Figure 5:
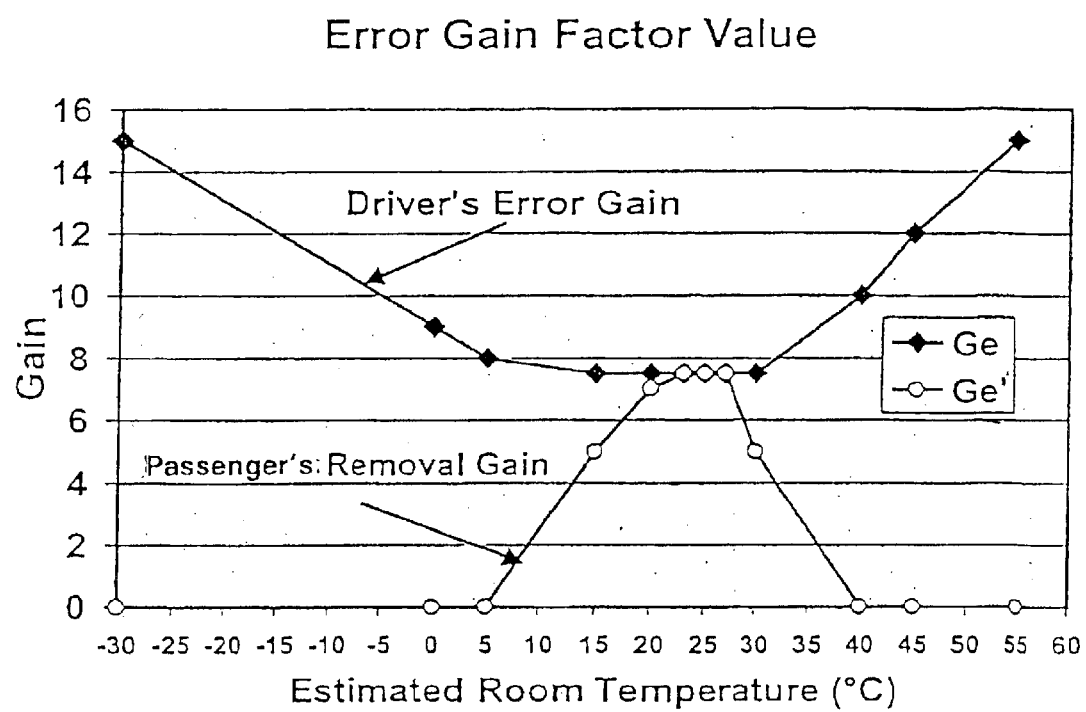
FIG. 5 schematically illustrates an example of error gain factor values.

The error gains of a preferred embodiment of the present invention are not constants, although other embodiments of the present invention can utilize constant error gains. FIG. 5 shows an example of customized error gain values that address the subjective nature of rapidly warming or rapidly cooling a vehicle cabin. The values of FIG. 5 are determined preferably through empirical testing, and can vary depending on the human factor constraints and/or the make of the vehicle. From FIG. 5, it is seen that the gain values vary depending on the estimated room temperature. It is noted that the present invention is not limited to the values presented in FIG. 5, since these values can and probably will be different depending on the results of the empirical testing.

By using separate variable error gains, transient temperature performance in a cabin can be controlled so that the passenger has a sensation of comfort. Thus, the present invention utilizes a heat flux scheme to deliver heat that is in proportion to the temperature error.

Due to the dominance of the driver's zone in the preferred embodiment of the present invention, there will be situations where the passenger makes a change to his or her target temperature and the algorithm does not provide a response that is perceived quickly enough or perceived to be substantial enough by the passenger. The present inventor has determined that a preferred embodiment of a climate control system for an automobile can have the ability to react aggressively to a change in the target temperature. For example and not by limitation, if the passenger had previously set the interior cabin temperature to 75° F. and he or she changes this setting to be 65° F., it would be desirable for the climate control system to react in a manner that provides the sensation to the passenger that the 65° F. temperature has been attained or quickly will be attained. This could be accomplished, for example, either by varying the blower speed of the climate control system or by lowering the outlet temperature on the passenger's side, or a combination of the two, for a sufficient period of time to provide the passenger with the sensation that the control system is quickly and sufficiently reacting to his or her desires.

Thus, a preferred embodiment of the present invention includes a temporary outlet temperature overshoot equation to provide a stimulus quickly to the passenger that will be interpreted by the passenger that a change has indeed taken place in the cabin climate. This is preferably accomplished by an equation that, when implemented into a control algorithm in a climate control system, will provide an overshoot or undershoot outlet temperature that will temporarily increase or decrease the outlet temperature in comparison to what it would normally be without this feature. By way of example and not by limitation, this feature could temporarily position the passenger's mix door to achieve the appropriate overshoot or undershoot.

In a preferred embodiment, equations for the temporary passenger outlet temperature overshoot are best formulated to be calculated periodically in a timing loop. In a preferred embodiment, the general overshoot equation for the desired overreaction margin to the passenger's target temperature change is:

$$\text{OverSet} = X \cdot (TGT(P) - FSet),$$

where X is a calibration value that sets the strength of the overshoot, and is determined based on empirical testing directed towards human factor conditions, and FSet is the time damped value of the passenger's target temperature, which can be determined from the equation $$FSet = FSet + Y \cdot (TGT(P) - FSet)$$

where Y is a multiplier that is arbitrarily set to allow the FSet equation to be utilized in an algorithm that obtains the unity value of FSet in a time period that will preferably maximize the passenger's comfort, as determined through empirical testing. For example, if the Y value is 0.1, the FSet equation will reach unity in approximately 100 loops. The calculated overshoot or undershoot value is added to the equation for ToP as follows:

$$ToP' = ToP + \text{OverSet} \cdot [1 + K/GA].$$

It is noted that the OverSet value can be either positive or negative, depending on whether an addition or subtraction to ToP is desired.

Thus, as the OverSet term is gradually reduced over time, the ToP' gradually approaches ToP, and eventually, ToP' becomes equal to ToP, and the overshoot adjustments are effectively no longer utilized in controlling the climate. By separating the overadjustment from the basic control equation, the driver's zone is kept from overreacting to the influence of the overshoot temperature.

The possibility exists that in a climate control system implementing the algorithms described above, the passenger can reach the limit of the air mix control. For example, if a strong sun load exists only on the passenger, the full cold air setting may not be enough to deliver comfort to the passenger, with a low blower speed that is sufficient for the shaded driver. (It is noted that in the preferred embodiment, the driver sets the blower speed for the entire cabin.) Thus, a preferred embodiment of the present invention includes an algorithm to calculate a minimum airflow that will satisfy the passenger when the full cold position has been reached on the passenger side. This algorithm is also applicable to the full hot condition as well. The following equation for a mass airflow rate has been developed to compensate for such a scenario:

$$GA = K \cdot (TGT(P) - Ta - q_s(P) \cdot GL/K)/(\text{Capacity Temperature} - TGT(P)) \tag{12}$$

where Capacity Temperature, in the preferred embodiment, is either a temperature about equal to or equal to the constant cooling device temperature (e.g., in the preferred embodiment, the constant evaporator temperature of the evaporator of the air conditioner system) or a temperature about equal to or equal to the constant heating device air out temperature (e.g., in the preferred embodiment, the constant heater core air outlet temperature), depending on whether the air conditioner or heater is operating, the preferred embodiment, these values are predetermined values and not values obtained by sensors, thus avoiding undesirable blower fluctuation with air conditioner system cycling and engine coolant temperature changes.

Thus, the climate control system of the present invention can be configured to identify situations where it is necessary to increase airflow on the passenger side from that set by the driver. By using equation (12), the minimum airflow value GA can be calculated. However, it is noted that the present invention preferably includes an algorithm that limits the airflow calculated from equation (12) to a value no greater than a predetermined amount above the driver's zone air flow. By way of example only and not by limitation, the passenger's airflow can be limited to an equivalent blower voltage that is no greater than, say 2.0 volts above the driver's system minimum blower speed in the present air mode.

In a preferred embodiment, this minimum blower voltage applies in parallel with other minimum adjustments. For example, should the sun load minimum blower speed adjustment exceed the adjustment determined by equation (12), this adjustment would not be applied. If equation (12) presented a minimum blower voltage greater than the sun load adjustment, equation (12) would effectively set the minimum blower speed.

In a preferred embodiment of the present invention, the climate control system utilizes an algorithm or a plurality of algorithms relating to at least one or more or all of the equations presented herein. In a preferred embodiment of the present invention, an algorithm relates to an equation when it utilizes the equation or a permutation of the equation or a mathematically equivalent equation or an equation that contains the variables of the equation as well as additional variables. By way of example, an algorithm that relies on, for example, equation (6), could utilize the equation, or could utilize a manipulated equation where, say, GA is on the left side of the equality and ToD is on the right side of the equality, etc. Further by way of example, an algorithm that relies on equation (7) could utilize the equation as seen above, or an equation with additional terms (by way of example, a term for internal heat generation by, say, the occupants). Thus, these equations represent minimums.

It is noted that in practicing the preferred embodiments of the present invention, empirical testing is relied on to obtain the values of various variables (e.g. R). However, it is noted that the present invention can be practiced by utilizing computational fluid dynamics based on mathematical models of the interior of a given cabin and the air flow in the cabin, with or without the use of a computer, to obtain one or more than one of the variables. Indeed, any practical method that can be used to obtain satisfactory values for these variables can be used to practice the present invention.

It is again noted that at least some of the above discussed variables are dependent on the vehicle design, and that these variables may be different depending on which vehicle in which the control system is implemented. These variables can be determined through empirical testing, calibration, or tuning, or through other types of testing, calibration, or tuning. In a preferred embodiment, these variables are determined and then treated as constants, and are not expected to change unless the structure or components of the automobile are changed.

It is also noted that the present invention can be used to automatically determine outlet temperatures and the mass flow rates by incorporating the present invention into a device, such as by way of example and not by way of limitation, a computer or a processor that will determine the outlet temperatures and the mass flow rates without the need of a human to determine the outlet temperatures and the mass flow rates. Basically, the present invention can be practiced with any type of logic circuit or logic device that can use the present invention to determine outlet temperatures and mass flow rates.

The teachings of the present invention can be utilized with a variety of control systems and controllers as would be apparent to one of ordinary skill in the art, including the systems taught in the '990 patent, as would be utilized exactly as taught or modified by one of ordinary skill in the art to practice the dual zone climate control system of the present invention, and are incorporated herein by reference in their entirety. Below is a discussion of how those teachings could be used to implement the present invention in a preferred embodiment.

Figure 6:
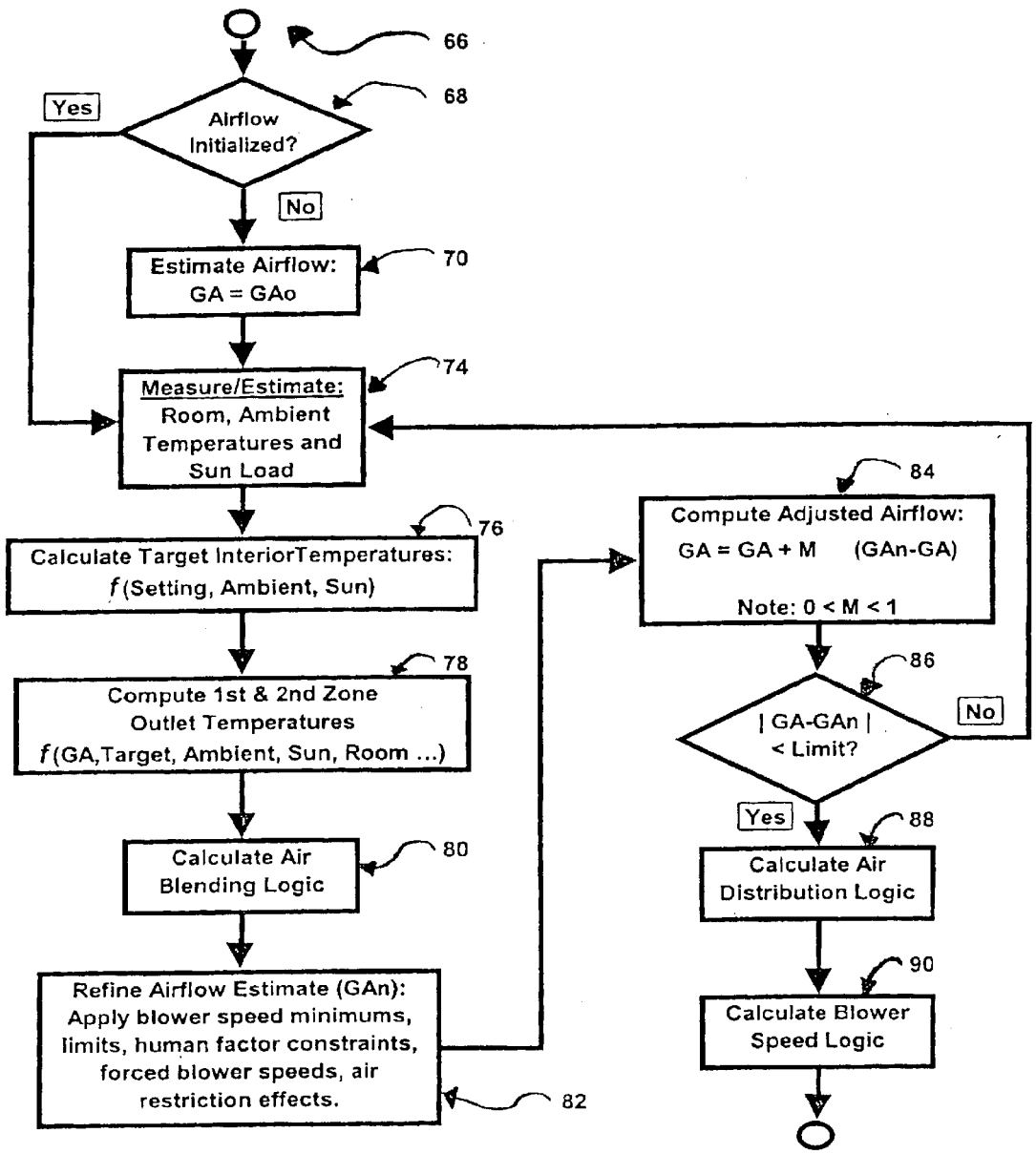
FIG. 6 is a logic flow chart illustrating process steps to implement an embodiment of the present invention.

FIG. 6 shows a flow diagram that illustrates the control steps for carrying out a control process of the present invention. The subjective requirements discussed above are contained in functions that are usually unique for each vehicle. The target interior temperature and the relationship of air flow and outlet temperature can be contained in these functions. The air flow that is desired is initialized at 66 in FIG. 6. An inquiry is made at 68 as to whether the initialization of flow is completed. If it is not completed, the process will proceed to action block 70, where the air flow is estimated. If it is completed, the process will proceed directly to action block 74, where the interior temperature and ambient temperature values, and the sun load, will be estimated or measured and, using the estimated/measured values, the desired target interior temperatures as a function of the temperature setting(s), the ambient temperature, and the sun load, is calculated at 76. New target values are then computed. The routine then proceeds to action block 78 where the outlet temperature for the first and second zone (e.g. driver and passenger zone) is computed using the heat flux equation, which is stored in a ROM. This is followed by the execution of the air blending control logic routine that occurs in, by way of example, a microprocessor, at block 80.

A refined air flow estimate GAn is then estimated at 82 to determine the new air flow. This air flow estimate is based on such factors as, by way of example and not by way of limitation, human factor constraints and air restriction effects. The airflow refinement may include blower speed minimum considerations related to sun load and other subjective considerations including constraining the blower speed to the outlet temperature. Further, the air blending action may create differences in the airflow that can be accounted for in the logic. An adjusted air flow then is computed at 84, based on the refined airflow estimate GAn. An inquiry then is made at 86 to determine whether the difference between the new air flow and the old air flow is less than a limit that is predetermined by calibration. If it is not less than that limit, the routine then will be repeated as the function flow returns to action block 74. The routine will repeat itself until the difference between the old air flow and the new air flow is less than a certain limit. At that time, the logic will then calculate an air distribution logic and a blower speed logic, as shown at blocks 88 and 90, respectively.

Figure 7:
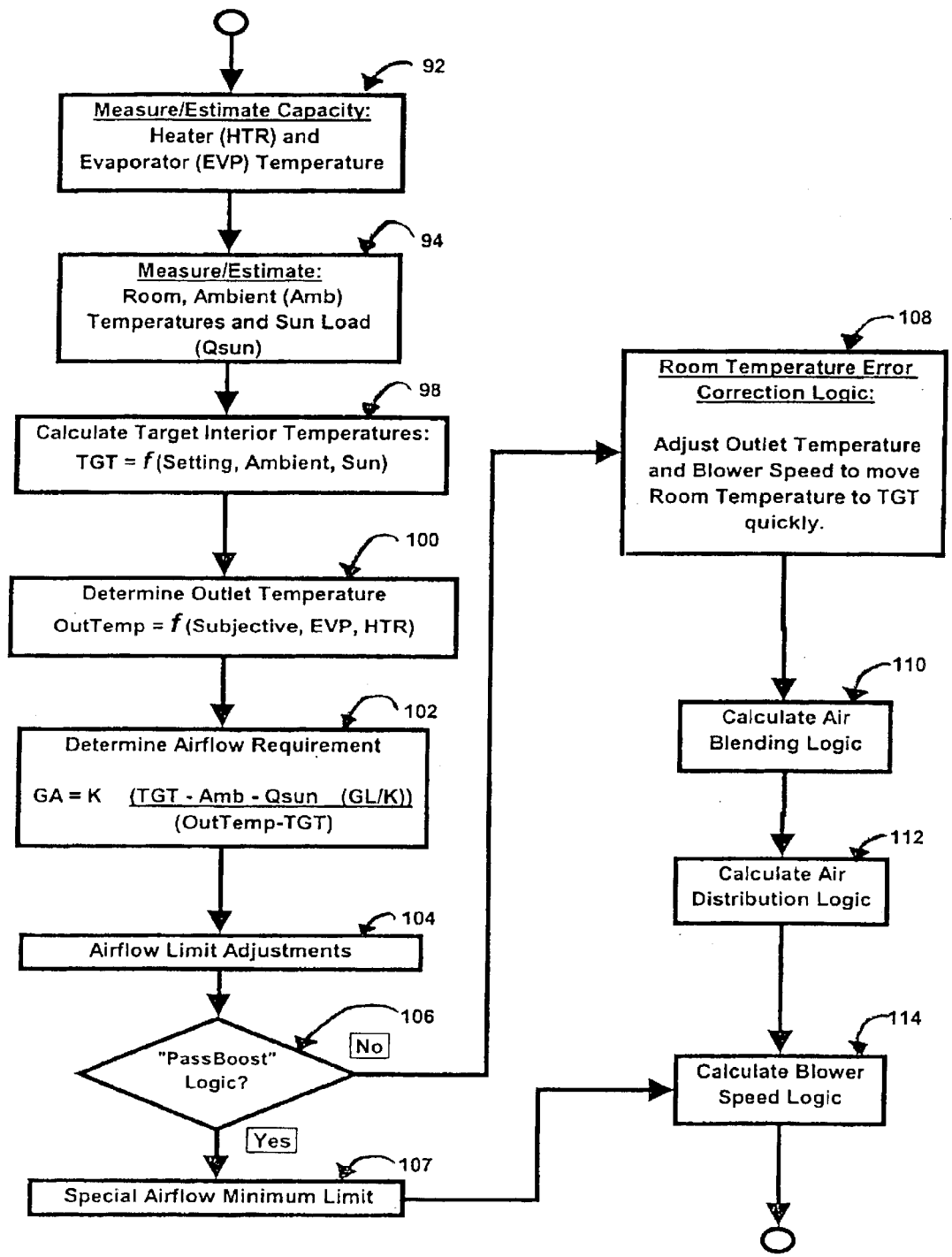
FIG. 7 is a logic flow chart illustrating process steps to implement an embodiment of the present invention.

The routine of FIG. 7 can be used to control the climate in the situation described above where an occupant of, say, the second zone, for example, a passenger (or, in other embodiments, an occupant of the first zone) reaches the limit of the air mix control. (e.g. a strong sun load exists only on the passenger and the full cold air setting is not enough to deliver comfort to the passenger.) At block 92, the heater and/or evaporator capacity temperature is measured or estimated. At action block 94, the interior temperature value(s), ambient temperature value, and the sun load will be estimated or measured and, using that estimated interior temperature value(s), the desired target outlet temperatures) as a function of the temperature setting(s), the ambient temperature, and the sun load, is calculated at 98.

At block 100, the target outlet temperature(s) is determined based on either the capacity temperature or the subjective temperature. The subjective temperature is derived from the statistical understanding of customer requirements. In the case where the system temperature limits (capacity) are exceeded by the customer requirements, the heater or evaporator temperatures are applied in place of the subjective requirements. For example, if the subjective outlet temperature requirement was 70° F. but the heater is only 65° F., the 65° F. would be used in the calculation. The "passboost" logic (see block 106) is a provision to aid in ensuring that a minimum blower speed is provided to a given zone dependent on the capacity temperature limits of the evaporator and the heater. Using the target outlet temperature determined at block 100 in combination with equation 12, the mass airflow rate GA requirement is determined at block 102. It is noted that the actions of blocks 98 and 100 can be accomplished both through the use of equations to calculate or iterate a value of the target interior temperature and/or the outlet temperature, a look up table, alone or in combination with fuzzy logic, can be used to obtain these values. If the embodiment of the present invention includes an algorithm that limits the airflow to a value no greater than a predetermined amount above the first zone (e.g. driver zone) air flow, an airflow limit adjustment is made at block 104. Further, this section can also provide values when the division at block 102 is indeterminate. At 106, a passboost logic routine is executed to ensure that a minimum blower speed is provided to a given zone dependent on the capacity temperature limits of the evaporator and the heater identified above. If the logic routine does not identify a minimum blower speed, room temperature error correction logic will be utilized at block 108 to adjust the outlet temperature and blower speed to increase or decrease the room temperature to the target temperature quickly. The routine will then proceed to block 110 where the air blend logic will be calculated, followed by the calculation of the air distribution logic at block 112 and the calculation of the blower speed logic at block 1114. In the event that a minimum blower speed is needed at 106, control blocks 108, 110 and 112 will be bypassed and the routine will proceed directly to control block 107 where the special airflow minimum limit will be set. After this, the logic will then calculate the blower speed logic at 114. It is further noted that the routine of FIG. 7 can allow for an additional specification of air flow and outlet temperature. After interior temperature is estimated, the routine will proceed to compute the desired interior temperature by taking into account ambient air temperature, temperature setting, and the sun load. The computation of the desired steady state outlet temperature can then be computed, after which the routine can proceed to compute interior temperature error gain for air flow. An interior temperature error gain for outlet temperatures can then be calculated, which can be used to calculate the current desired outlet temperature.

It is noted that the present invention can be practiced with a variety of air conditioning systems and system components, such as that taught in U.S. Pat. No. 6,272,873.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. A method for automatically controlling the climate in a plurality of climate control zones of a cabin of an automobile comprising at least a first zone and a second zone having a temperature sensor located in the first zone and a conditioned air outlet vent in each of the zones, the method comprising:

obtaining a target temperature value for the first zone and the second zone;

obtaining a first zone temperature value estimate from the sensor in the first zone;

obtaining an ambient air temperature value;

obtaining a sun load heat flux value for at least one of the first zone and the second zone;

obtaining a first zone gain factor value based at least on the first zone temperature value estimate;

automatically determining the outlet temperatures and mass flow rates of the first zone outlet and the second zone outlet based at least on the above obtained values and on a conduction/convection heat transfer coefficient between the cabin and ambient air, an effective glass area for solar load transmission, a zone air crossover influence factor, and predetermined constraints on the relationship of the outlet temperatures and air flow, wherein the zone air crossover influence factor is a factor based on blending of air in the cabin; and providing conditioned air to the cabin from the first zone outlet and the second zone outlet at outlet temperatures and mass flow rates correlating to the determined outlet temperatures and mass flow rates.

2. The method of claim 1, wherein the zone air crossover influence factor is variable and depends on an air distribution mode.

3. The method of claim 1, further including calculating an error term and subtracting it from the second zone outlet temperature to establish a new second zone outlet temperature, the error term comprising a value based on the first zone target temperature value, the first zone temperature value estimate, the mass air flow rate of the second zone outlet, and a second zone gain factor value based at least on the first zone temperature value estimate, wherein the conditioned air provided to the second zone is at the new second zone outlet temperature.

4. The method of claim 3, wherein the first zone gain factor value and the second zone gain factor value are approximately equal when the first zone temperature estimate is between about 20° C. and about 28° C.

5. The method of claim 4, wherein the first zone gain factor value and the second zone gain factor value vary inversely in relation to changing first zone temperature estimates between at least the range from about 10° C. to about 20° C. and between at least the range from about 28° C. to about 35° C.

6. The method of claim 5, wherein the first zone gain factor value decreases with increasing first zone temperature estimates below about 20° C. and increases with increasing first zone temperature estimates above about 28° C.

7. The method of claim 1, further including calculating an overset value to be added to the second zone outlet temperature value, the overset value comprising a value based on the second zone target temperature value, the conduction/convection heat transfer coefficient between the cabin and the ambient air, and the mass air flow rate, as adjusted by a value that sets the strength of the overshoot.

8. The method of claim 1, wherein the mass flow rate of the conditioned air provided to the first zone is about the same as the mass flow rate of the conditioned air provided to the second zone.

9. The method of claim 8, further including calculating a minimum mass air flow rate based on the conduction/convection heat transfer coefficient between the cabin and the ambient air, the second zone target temperature value, the ambient air temperature value, the sun load heat flux value for the second zone, the effective glass area for solar load transmission, and a capacity temperature value selected from a group consisting of a constant cooling device temperature and a constant heating device temperature, and wherein the mass air flow rate of the conditioned air delivered to the cabin is based on the calculated minimum mass air flow rate.

10. The method of claim 9, wherein the mass air flow rate of the air delivered to the cabin is limited to a predetermined maximum mass air flow rate above a variable mass flow rate based on predetermined constraints.

11. The method of claim 10, wherein the variable mass flow rate based on predetermined constraints is substantially correlated to various blower voltages, the maximum mass air flow rate is substantially correlated to the blower voltage, and wherein the maximum mass air flow rate is limited to an equivalent blower voltage that is no greater than about 2 volts above the equivalent voltage of the mass air flow rate based on predetermined constraints.

12. The method of claim 1, wherein the conditioned air provided to the cabin from the first zone outlet and the second zone outlet at outlet temperatures and mass flow rates is equal to the determined outlet temperatures and mass flow rates, respectively.

13. The method of claim 1, wherein the first zone is a driver zone and the second zone is the passenger zone.

14. A method for automatically controlling the climate in a plurality of climate control zones of a cabin of an automobile comprising at least a first zone and a second zone having a temperature sensor located in a first zone and an conditioned air outlet vent in each of the zones, the method comprising at least utilizing an algorithm relating to at least equations $$ToD=[TGT(D)+(Ge \cdot (TGT(D)-RMd)+K \cdot (TGT(D)-T_a)-q_{s(D)} \cdot GL)/GA - R \cdot ToPa]/(1-R)$$

and $$ToP=ToD+([TGT(P)-TGT(D)] \cdot (1+K/GA)-[q_{s(P)}-q_{s(D)}] \cdot GL/GA)/(1-R)$$

where:
ToD=F first zone outlet temperature,
ToP=S second zone outlet temperature,
TGT(D)=First zone target temperature,
TGT(P)=Second zone target temperature,
Ge=Gain factor,
RMd=First zone temperature estimate from sensor,
$q_{s(D)}$=First zone sun load heat flux,
$q_{s(P)}$=Second zone sun load heat flux,
GL=Effective glass area for solar load transmission,
$T_a$=Ambient temperature,
GA=Mass air flow rate,
K=Conduction or convection heat transfer coefficient between the cabin and ambient air,
R=Zone crossover influence factor,
ToPa=The second zone's true outlet temperature,
   (Evaporator Temperature $\leq$ ToPa $\leq$ Heater Air Outlet Temperature),
the method comprising:
   automatically determining ToD, ToP, and GA by solving the above equations with predetermined constraints on the relationship of ToD, ToP, and GA; and
   providing conditioned air to the cabin from the first zone outlet and the second zone outlet at outlet temperatures and mass flow rates correlating to the determined outlet temperatures and mass flow rates.

15. The method of claim 14, wherein $$Ge' \cdot (TGT(D)-RMd)/GA$$

is subtracted from the calculated value of ToP, wherein Ge' is a gain factor less than or equal to Ge.

16. The method of claim 15, wherein Ge and Ge' are approximately equal when the first zone temperature estimate is between about 20° C. and about 28° C.

17. The method of claim 16, wherein Ge and Ge' vary inversely in relation to changing first zone temperature estimates between at least the range from about 10° C. to about 20° C. and between at least the range from about 28° C. to about 35° C.

18. The method of claim 17, wherein Ge decreases with increasing first zone temperature estimates below about 20° C. and increases with increasing first zone temperature estimates above about 28° C.

19. The method of claim 14, wherein $$OverSet \cdot [1+K/GA]$$

is added to the value of ToP, where $$OverSet=X \cdot (TGT(P)-FSet),$$

where X is a calibration value, and where $$FSet=FSet+Y \cdot (TGT(P)-FSet),$$

where Y is a multiplier that is arbitrarily set to allow the FSet equation to be utilized in an algorithm that obtains the unity value of FSet by a loop routine.

20. The method of claim 14, further including calculating a minimum mass air flow rate from the equation:

$$GA=K \cdot (TGT(P)-Ta-q_s(P) \cdot GL/K)/(Capacity\ Temperature-TGT(P))$$

where Capacity Temperature is a value selected from a group consisting of a constant cooling device temperature and a constant heating device temperature, and wherein the mass air flow rate of the conditioned air delivered to the cabin is based on the calculated minimum mass air flow rate.

21. The method of claim 20, wherein the mass air flow rate of the air delivered to the cabin is limited to a predetermined maximum mass air flow rate above a variable mass flow rate based on predetermined constraints.

22. The method of claim 21, wherein the variable mass flow rate based on predetermined constraints is substantially correlated to various blower voltages, the maximum mass air flow rate is substantially correlated to the blower voltage, and wherein the maximum mass air flow rate is limited to an equivalent blower voltage that is no greater than about 2 volts above an equivalent voltage of the mass air flow rate based on predetermined constraints.

23. The method of claim 14, wherein the conditioned air provided to the cabin from the first zone outlet and the second zone outlet at outlet temperatures and mass flow rates is equal to the determined outlet temperatures and mass flow rates, respectively.

24. An automobile having an automatic climate control system according to claim 23.

25. The method of claim 14, wherein the constraints include human constraint factors that modify thermodynamic constraint factors in the relationship of air flow and the outlet temperatures, and wherein the method further includes repeatedly addressing the constraints in response to incremental changes in variables in the equations to effect a change that will result in a modification of the outlet temperatures.

26. The method of claim 14, wherein the first zone is a driver zone and the second zone is the passenger zone.

27. An automatic climate control apparatus for automatically controlling climate in a plurality of climate control zones of a cabin of an automobile comprising at least a first zone and a second zone, comprising:
   an air blower adapted to blow conditioned air into the cabin;
   an air outlet vent in the first zone in fluid communication with the air blower;

an air outlet vent in the second zone in fluid communication with the air blower;

an air cooling device and an air heating device in fluid communication with the air blower, the first zone vent, and the second zone vent;

a temperature sensor located in the first zone adapted to provide a temperature value estimate of the first zone;

an electronic processor device comprising a processor and a memory, wherein the memory is adapted to store a plurality of equations, the plurality of equations including equations for the air outlet temperatures and mass flow rates of the first zone outlet and the second zone outlet, the equations being based on variables including:

a target temperature value for the first zone and the second zone;
a first zone temperature value estimate;
an ambient air temperature value;
a sun load heat flux value for at least one of the first zone and the second zone;
a first zone gain factor value based at least on the first zone temperature value estimate;
a conduction/convection heat transfer coefficient between the cabin and the ambient air;
an effective glass area for solar load transmission; and
a zone air crossover influence factor, wherein the zone air crossover influence factor is a factor based on blending of air in the cabin; wherein
the electronic processor is adapted to automatically control and adjust mass flow rate and temperature of the air being blown from the vents based on the equations as constrained by predetermined constraints on the relationship of the outlet temperatures and air flow.

28. The apparatus of claim 27, further including a device adapted to vary the amount of air entering the cabin that has passed through or around the air heating device.

29. The apparatus of claim 27, wherein the conditioned air provided to the cabin from the first zone outlet and the second zone outlet at outlet temperatures and mass flow rates is equal to the determined outlet temperatures and mass flow rates, respectively.

30. The apparatus of claim 27, wherein the first zone is a driver zone and the second zone is the passenger zone.

31. A climate control device for controlling at least one component of a climate control system that controls climate in a plurality of climate control zones of a cabin of an automobile comprising at least a first zone and a second zone, comprising:

a device adapted to receive a signal representing mass flow rate of conditioned air being blown into the cabin;
a device adapted to output a signal to control heating and cooling of air being blown into the cabin;
a device adapted to output a signal to control the mass flow rate of air being blown into the cabin;
a device adapted to receive a signal representative of a sensed temperature inside the cabin;
a device storing an algorithm based on at least a plurality of equations, the plurality of equations including equations for air outlet temperatures and mass flow rates of first zone outlet and second zone outlet, the equations being based on variables including:
a target temperature value for the first zone and the second zone;
a first zone temperature value estimate;
an ambient air temperature value;
a sun load heat flux value for at least one of the first zone and the second zone;
a first zone gain factor value based at least on the first zone temperature value estimate;
a conduction/convection heat transfer coefficient between the cabin and ambient air;
an effective glass area for solar load transmission; and
a zone air crossover influence factor, wherein the zone air crossover influence factor is a factor based on blending of air in the cabin; and
a device storing a plurality of predetermined constraints on a relationship of the first zone and second zone outlet temperatures and air flow; wherein
the control device is adapted to automatically output a signal to control and adjust the mass flow rate and temperature of air being blown from the vents based on the equations as constrained by the predetermined constraints on the relationship of the outlet temperatures and air flows.

32. The apparatus of claim 31, wherein the first zone is a driver zone and the second zone is the passenger zone.

33. A method for automatically controlling climate in a plurality of climate control zones of a cabin of an automobile comprising at least a first zone and a second zone having a temperature sensor located in the first zone and a temperature sensor located in the second zone and an conditioned air outlet vent in each of the zones, the method comprising:

obtaining a target temperature value for the first zone and the second zone;
obtaining temperature value estimates for the first zone and the second zone from the first zone temperature sensor and the second zone temperature sensor respectively;
obtaining an ambient air temperature value;
obtaining a sun load heat flux value for at least one of the first zone and the second zone;
obtaining at least one of a gain factor value based the first zone temperature value estimate and a gain factor value based on the second zone temperature value estimate;
automatically determining outlet temperatures and mass flow rates of the first zone outlet and the second zone outlet based at least on the above obtained values and on a conduction/convection heat transfer coefficient between the cabin and ambient air, an effective glass area for solar load transmission, a zone air crossover influence factor, and predetermined constraints on a relationship of the outlet temperatures and air flow; wherein the zone air crossover influence factor is a factor based on blending of air in the cabin; and,
providing conditioned air to the cabin from the first zone outlet and the second zone outlet at outlet temperatures and mass flow rates correlating to the determined outlet temperatures and mass flow rates.

34. The method of claim 33, wherein the zone air crossover influence factor is variable and depends on an air distribution mode.

35. The method of claim 33, wherein the mass flow rate of the conditioned air provided to the first zone is about the same as the mass flow rate of the conditioned air provided to the second zone.

36. The method of claim 35, further including calculating a minimum mass air flow rate based on the conduction/convection heat transfer coefficient between the cabin and the ambient air, the second zone target temperature value, the ambient air temperature value, the sun load heat flux value for the second zone, the effective glass area for solar load transmission, and a capacity temperature value selected from a group consisting of a constant cooling device temperature and a constant heating device temperature, wherein the mass air flow rate of the conditioned air delivered to the cabin is based on the calculated minimum mass air flow rate.

37. The method of claim 36, wherein the mass air flow rate of the air delivered to the cabin is limited to a predetermined maximum mass air flow rate above a variable mass flow rate based on predetermined constraints.

38. The method of claim 37, wherein the variable mass flow rate based on predetermined constraints is substantially correlated to various blower voltages, the maximum mass air flow rate is substantially correlated to the blower voltage, and wherein the maximum mass air flow rate is limited to an equivalent blower voltage that is no greater than about 2 volts above the equivalent voltage of the mass air flow rate based on predetermined constraints.

39. The method of claim 33, wherein the conditioned air provided to the cabin from the first zone outlet and the second zone outlet at outlet temperatures and mass flow rates is equal to the determined outlet temperatures and mass flow rates, respectively.

40. The method of claim 38, wherein the first zone is a driver zone and the second zone is the passenger zone.

41. A method for automatically controlling climate in a plurality of climate control zones of a cabin of an automobile comprising at least a first zone and a second zone and having a temperature sensor located in the first zone and a temperature sensor located in the second zone and an air outlet vent in each of the zones, the method comprising at least utilizing an algorithm relating to at least equations:

$$ToD = [TGT(D) + (Ge_{(D)} \cdot (TGT(D) - RMd) + K \cdot (TGT(D) - T_a) - q_{s(D)} \cdot GL)/GA_{(D)} - R \cdot ToPa]/(1-R)$$

and $$ToP = [TGT(P) + (Ge_{(P)} \cdot (TGT(P) - RMp) + K \cdot (TGT(P) - T_a) - q_{s(P)} GL)/GA_{(P)} - R \cdot ToDa]/(1-R)$$

where:
ToD=First zone outlet temperature,
ToP=Second zone outlet temperature,
TGT(D)=First zone target temperature,
TGT(P)=Second zone target temperature,
$Ge_{(D)}$=Gain factor based on a first zone temperature value estimate,
$Ge_{(P)}$=Gain factor based on a second zone temperature value estimate,
RMd=First zone temperature estimate from sensor,
RMp=Second zone temperature estimate from sensor,
$q_{s(D)}$=First zone sun load heat flux,
$q_{s(P)}$=Second zone sun load heat flux,
GL=Effective glass area for solar load transmission,
$T_a$=Ambient temperature,
$GA_{(D)}$=Mass air flow rate of the first zone,
$GA_{(P)}$=Mass air flow rate of the second zone,
K=Conduction or convection heat transfer coefficient between the cabin and ambient air,
R=Zone crossover influence factor,
ToPa=The second zone's true outlet temperature, (Evaporator Temperature≦ToPa≦Heater Air Outlet Temperature),
ToDa=The first zone's true outlet temperature, (Evaporator Temperature≦ToDa≦Heater Air Outlet Temperature),
the method comprising:

automatically determining ToD and ToP, and GA by solving the above equations with predetermined constraints on a relationship of ToD, ToP, $GA_{(D)}$ and $GA_{(P)}$; and providing conditioned air to the cabin from the first zone outlet and the second zone outlet at outlet temperatures and mass flow rates correlating to the determined outlet temperatures and mass flow rates.

42. The method of claim 41, wherein the conditioned air provided to the cabin from the first zone outlet and the second zone outlet at outlet temperatures and mass flow rates is equal to the determined outlet temperatures and mass flow rates, respectively.

43. The method of claim 42, wherein $GA_{(D)}$ is equal to or about equal to $GA_{(P)}$.

44. The method of claim 42, wherein $Ge_{(D)}$ is equal to or about equal to $Ge_{(P)}$.

45. The method of claim 43, further including calculating a minimum mass air flow rate from the equation:

$$GA_{(D/P)} = K \cdot (TGT(P) - Ta - q_s(P) \cdot GL/K)/(\text{Capacity Temperature} - TGT(P))$$

where Capacity Temperature is a value selected from a group consisting of a constant cooling device temperature and a constant heating device temperature, and wherein the mass air flow rate of the conditioned air delivered to the cabin is based on the calculated minimum mass air flow rate.

46. The method of claim 45, wherein the mass air flow rate of the air delivered to the cabin is limited to a predetermined maximum mass air flow rate above a variable mass flow rate based on predetermined constraints.

47. The method of claim 45, wherein the variable mass flow rate based on predetermined constraints is substantially correlated to various blower voltages, the maximum mass air flow rate is substantially correlated to the blower voltage, and wherein the maximum mass air flow rate is limited to an equivalent blower voltage that is no greater than about 2 volts above the equivalent voltage of the mass air flow rate based on predetermined constraints.

48. The method of claim 41, wherein the first zone is a driver zone and the second zone is the passenger zone.

49. An automatic climate control apparatus for automatically controlling climate in a plurality of climate control zones of a cabin of an automobile comprising at least a first zone and a second zone, comprising:

an air blower adapted to blow conditioned air into the cabin;

an air outlet vent in the first zone in fluid communication with the air blower;

an air outlet vent in the second zone in fluid communication with the air blower;

an air cooling device and an air heating device in fluid communication with the air blower, the first zone vent, and the second zone vent;

a temperature sensor located in the first zone adapted to provide a temperature value estimate of the first zone;

an electronic processor device comprising a processor and a memory, wherein the memory is adapted to store a plurality of equations, the plurality of equations including equations for the air outlet temperatures and mass flow rates of the first zone outlet and the second zone outlet, the equations being based on variables including:

a target temperature value for the first zone and the second zone;

a first zone temperature value estimate;

an ambient air temperature value;

a sun load heat flux value for at least one of the first zone and the second zone;

a first zone gain factor value based at least on the first zone temperature value estimate;

a conduction/convection heat transfer coefficient between the cabin and ambient air;

an effective glass area for solar load transmission; and a zone air crossover influence factor, wherein the zone air crossover influence factor is a factor based on blending of air in the cabin; wherein the electronic processor is adapted to automatically control and adjust the mass flow rate and the temperature of the air being blown from the vents based on the equations as constrained by predetermined constraints on the relationship of the outlet temperatures and air flow.

50. The apparatus of claim 49, wherein the first zone is a driver zone and the second zone is the passenger zone.

51. A method for automatically controlling the climate in a plurality of climate control zones of a cabin of an automobile comprising at least a first zone and a second zone having a temperature sensor located in a first zone and an conditioned air outlet vent in each of the zones, the method comprising at least utilizing an algorithm relating to at least equations $$ToD=[TGT(D)+(Ge \cdot (TGT(D)-RMd)+K \cdot (TGT(D)-T_a)-q_{s(D)} \cdot GL/GA-R \cdot ToP]/(1-R)$$

and $$ToP=ToD+([TGT(P)-TGT(D)] \cdot (1+K/GA)-[q_{s(P)}-q_{s(D)}] \cdot GL/GA)/(1-R)$$

where:

ToD=First zone outlet temperature,

ToP=Second zone outlet temperature,

TGT(D)=First zone target temperature,

TGT(P)=Second zone target temperature,

Ge=Gain factor,

RMd=First zone temperature estimate from sensor, $q_{s(D)}$=First zone sun load heat flux, $q_{s(P)}$=Second zone sun load heat flux, GL=Effective glass area for solar load transmission, $T_a$=Ambient temperature, GA=Mass air flow rate, K=Conduction or convection heat transfer coefficient between the cabin and ambient air, R=Zone crossover influence factor, the method comprising:

automatically determining ToD, ToP, and GA by solving the above equations with predetermined constraints on the relationship of ToD, ToP, and GA; and providing conditioned air to the cabin from the first zone outlet and the second zone outlet at outlet temperatures and mass flow rates correlating to the determined outlet temperatures and mass flow rates.

52. A method for automatically controlling climate in a plurality of climate control zones of a cabin of an automobile comprising at least a first zone and a second zone and having a temperature sensor located in the first zone and a temperature sensor located in the second zone and an air outlet vent in each of the zones, the method comprising at least utilizing an algorithm relating to at least equations:

$$ToD=[TGT(D)+(Ge_{(D)} \cdot (TGT(D)-RMd)+K \cdot (TGT(D)-T_a)-q_{s(D)} \cdot GL/GA_{(D)}-R \cdot ToP]/(1-R)$$

and $$ToP=[TGT(P)+(Ge_{(P)} \cdot (TGT(P)-RMp)+K \cdot (TGT(P)-T_a)-q_{s(P)} \cdot GL/GA_{(P)}-R \cdot ToD]/(1-R)$$

where:

ToD=First zone outlet temperature,

ToP=Second zone outlet temperature,

TGT(D)=First zone target temperature,

TGT(P)=Second zone target temperature, $Ge_{(D)}$=Gain factor based on a first zone temperature value estimate, $Ge_{(P)}$=Gain factor based on a second zone temperature value estimate, RMd=First zone temperature estimate from sensor, RMp=Second zone temperature estimate from sensor, $q_{s(D)}$=First zone sun load heat flux, $q_{s(P)}$=Second zone sun load heat flux, GL=Effective glass area for solar load transmission, $T_a$=Ambient temperature, $GA_{(D)}$=Mass air flow rate of the first zone, $GA_{(P)}$=Mass air flow rate of the second zone, K=Conduction or convection heat transfer coefficient between the cabin and ambient air, R=Zone crossover influence factor, the method comprising:

automatically determining ToD and ToP, and GA by solving the above equations with predetermined constraints on a relationship of ToD, ToP, $GA_{(D)}$ and $GA_{(P)}$; and providing conditioned air to the cabin from the first zone outlet and the second zone outlet at outlet temperatures and mass flow rates correlating to the determined outlet temperatures and mass flow rates.

* * * * *